US012423702B2

(12) United States Patent
Ranjan et al.

(10) Patent No.: US 12,423,702 B2
(45) Date of Patent: Sep. 23, 2025

(54) NEURAL NETWORK BASED METHODS AND SYSTEMS FOR INCREASING APPROVAL RATES OF PAYMENT TRANSACTIONS

(71) Applicant: MASTERCARD INTERNATIONAL INCORPORATED, Purchase, NY (US)

(72) Inventors: Rajesh Kumar Ranjan, Madhubani (IN); Garima Arora, Gtb Nagar (IN); Debasmita Das, Kolkata (IN); Ankur Saraswat, Gurgaon (IN); Yatin Katyal, Rohtak (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 292 days.

(21) Appl. No.: 17/938,735

(22) Filed: Oct. 7, 2022

(65) Prior Publication Data

US 2023/0111445 A1 Apr. 13, 2023

(30) Foreign Application Priority Data

Oct. 9, 2021 (IN) .............................. 202141046105

(51) Int. Cl.
*G06Q 20/40* (2012.01)
*G06N 3/04* (2023.01)
*G06N 3/08* (2023.01)

(52) U.S. Cl.
CPC ........... *G06Q 20/4016* (2013.01); *G06N 3/04* (2013.01); *G06N 3/08* (2013.01)

(58) Field of Classification Search
CPC ......... G06Q 20/4016; G06N 3/04; G06N 3/08
See application file for complete search history.

(56) References Cited

U.S. PATENT DOCUMENTS

| 8,676,726 | B2 * | 3/2014 | Hore ........................ G06N 5/02 706/12 |
| 11,348,110 | B2 * | 5/2022 | Adjaoute ........... G06Q 20/4016 |

(Continued)

FOREIGN PATENT DOCUMENTS

| CN | 110413877 A | 11/2019 |
| CN | 111882441 A | 11/2020 |

(Continued)

OTHER PUBLICATIONS

N. Kalaiselvi, S. Rajalakshmi, J. Padmavathi and J. B. Karthiga, "Credit Card Fraud Detection Using Learning to Rank Approach," 2018 International Conference on Computation of Power, Energy, Information and Communication (ICCPEIC), Chennai, India, 2018, pp. 191-196, doi: 10.1109/ICCPEIC.2018.8525171.*

(Continued)

*Primary Examiner* — Steven S Kim
(74) *Attorney, Agent, or Firm* — Jordan IP Law, LLC

(57) ABSTRACT

Embodiments of present disclosure provide methods and systems for increasing transaction approval rate. Method performed includes accessing transaction features and determining via fraud model and approval model, first and second set of rank-ordered transaction features. Method includes computing difference in ranks of transaction features and determining set of utilized and unutilized transaction features and generating simulated authorizing model and computing simulated transaction approval rate and simulated fraud transaction rate for simulated authorizing model. Method includes generating plurality of proxy authorization models. Method includes computing transaction approval rates and fraud transaction rates for each of plurality of proxy authorization models and computing an increase in transaction approval rate and change in fraud transaction rate for each of plurality of proxy transaction approval models. Method includes determining one or more recom- (Continued)

mended transaction features from set of unutilized transaction features and transmitting one or more recommended transaction features to authorizing entity.

16 Claims, 15 Drawing Sheets

(56) References Cited

U.S. PATENT DOCUMENTS

| | | | | |
|---|---|---|---|---|
| 11,410,187 | B2* | 8/2022 | Hearty | G06Q 20/4016 |
| 11,507,953 | B1* | 11/2022 | Cohn | G06N 20/00 |
| 12,293,362 | B2* | 5/2025 | Vashisht | G06Q 20/12 |
| 2020/0250556 | A1 | 8/2020 | Nourian et al. | |
| 2020/0272913 | A1 | 8/2020 | Yu et al. | |
| 2021/0125179 | A1* | 4/2021 | Mach | G06Q 20/401 |
| 2021/0192524 | A1* | 6/2021 | Saleh | G06Q 20/4016 |
| 2022/0005041 | A1* | 1/2022 | Chang | G06F 18/24 |
| 2022/0300976 | A1* | 9/2022 | Bhatt | G06Q 20/4016 |
| 2023/0186311 | A1* | 6/2023 | Vimal | G06Q 40/02 705/44 |
| 2023/0274009 | A1* | 8/2023 | Shaik | G06F 21/604 706/25 |
| 2024/0177164 | A1* | 5/2024 | Pandey | G06Q 20/4016 |

FOREIGN PATENT DOCUMENTS

| | | |
|---|---|---|
| WO | 2020065611 A1 | 4/2020 |
| WO | 2020181911 A1 | 9/2020 |

OTHER PUBLICATIONS

Ghosh and Reilly, "Credit card fraud detection with a neural-network," 1994 Proceedings of the Twenty-Seventh Hawaii International Conference on System Sciences, Wailea, HI, USA, 1994, pp. 621-630, doi: 10.1109/HICSS.1994.323314.*

A. Roy, J. Sun, R. Mahoney, L. Alonzi, S. Adams and P. Beling, "Deep learning detecting fraud in credit card transactions," 2018 Systems and Information Engineering Design Symposium (SIEDS), Charlottesville, VA, USA, 2018, pp. 129-134, doi: 10.1109/SIEDS.2018.8374722.*

K. I. Alkhatib, A. I. Al-Aiad, M. H. Almahmoud and O. N. Elayan, "Credit Card Fraud Detection Based on Deep Neural Network Approach," 2021 12th International Conference on Information and Communication Systems (ICICS), Valencia, Spain, 2021, pp. 153-156, doi: 10.1109/ICICS52457.2021.9464555.*

N. Kalaiselvi, S. Rajalakshmi, J. Padmavathi and J. B. Karthiga, "Credit Card Fraud Detection Using Learning to Rank Approach," 2018 International Conference on Computation of Power, Energy, Information and Communication (ICCPEIC), Chennai, India, 2018, pp. 191-196.*

Mingming Guo et al., "Online Product Feature Recommendations with Interpretable Machine Learning", SIGIR eCom 20, Jul. 30, 2020, Virtual Event, 7 pages. https://sigir-ecom.github.io/ecom20Papers/paper13.pdf.

Gabriel Tseng, "Interpreting complex models with SHAP values", Jun. 20, 2018, 12 pgs. https://medium.com/@gabrieltseng/interpreting-complex-models-with-shap-values-1c187db6ec83.

Editorial Team, "How Data Science Work Reveals Hidden Trends in Payment Success Rates", Recurly blog, Jul. 3, 2019, 8 pgs. https://recurly.com/blog/how-data-science-work-reveals-hidden-trends-in-payment-success-rates/.

Kasey Chappelle, "How we built Success+ using our ethical machine learning programme", GoCardless blog, Apr. 2020, 12 pgs. https://gocardless.com/blog/how-we-built-success-plus-ethical-machine-learning/.

Fiserv, Inc., "Payment Optimization", Solutions webpage, Retrieved 2021, 7pgs. https://merchants.fiserv.com/en-us/products/merchants/authorization-optimization/?utm_campaign=fiserv_firstdata_rd&utm_source=firstdataus.

* cited by examiner

| INDEX | VAR 1 | VAR 2 | VAR 3 | PRODUCT 1 | PRODUCT 2 | PRODUCT 3 | PRODUCT 4 |
|---|---|---|---|---|---|---|---|
| 1 | XX | XX | XX | 1 | 0 | 0 | 0 |
| 2 | XX | XX | XX | 1 | 0 | 0 | 0 |
| 3 | XX | XX | XX | 1 | 0 | 0 | 0 |
| 4 | XX | XX | XX | 0 | 0 | 0 | 0 |
| 5 | XX | XX | XX | 0 | 0 | 0 | 0 |

FIG. 6A

| INDEX | VAR 1 | VAR 2 | VAR 3 | PRODUCT 1 | PRODUCT 2 | PRODUCT 3 | PRODUCT 4 | SCORE |
|---|---|---|---|---|---|---|---|---|
| 1 | XX | XX | XX | 1 | 0 | 0 | 0 | 0.76 |
| 2 | XX | XX | XX | 1 | 0 | 0 | 0 | 0.23 |
| 3 | XX | XX | XX | 1 | 0 | 0 | 0 | 0.98 |
| 4 | XX | XX | XX | 0 | 0 | 0 | 0 | 0.97 |
| 5 | XX | XX | XX | 0 | 0 | 0 | 0 | 0.65 |

| INDEX | VAR 1 | VAR 2 | VAR 3 | PRODUCT 1 | PRODUCT 2 | PRODUCT 3 | PRODUCT 4 | SCORE |
|---|---|---|---|---|---|---|---|---|
| 1 | XX | XX | XX | 1 | 1 | 0 | 0 | 0.12 |
| 2 | XX | XX | XX | 1 | 1 | 0 | 0 | 0.24 |
| 3 | XX | XX | XX | 1 | 1 | 0 | 0 | 0.87 |
| 4 | XX | XX | XX | 0 | 1 | 0 | 0 | 0.97 |
| 5 | XX | XX | XX | 0 | 1 | 0 | 0 | 0.43 |

| INDEX | SCORE | SCORE WITH PRODUCT 2 FOR ALL TRANSACTIONS | CHANGE IN SCORE | PERCENTAGE CHANGE | EXPECTED APPROVED |
|---|---|---|---|---|---|
| 1 | 0.76 | 0.12 | 0.64 | 84% | 1 |
| 2 | 0.23 | 0.24 | -0.01 | -4% | 0 |
| 3 | 0.98 | 0.87 | 0.11 | 11% | 1 |
| 4 | 0.97 | 0.97 | 0 | 0% | 0 |
| 5 | 0.65 | 0.43 | 0.22 | 34% | 1 |
| EXPECTED APPROVAL RATE FOR DECLINED TRANSACTIONS | | | | | 67% |

NEURAL NETWORK BASED METHODS AND SYSTEMS FOR INCREASING APPROVAL RATES OF PAYMENT TRANSACTIONS

CROSS-REFERENCE TO RELATED APPLICATIONS

The present application claims priority to India Provisional Patent Application No. 20141046105 (filed on Oct. 9, 2021), which is hereby incorporated by reference in its entirety.

TECHNICAL FIELD

The present disclosure relates to artificial intelligence processing systems and, more particularly to, electronic methods and complex processing systems for recommending an optimal combination of authorization decision products and/or significant transaction features to be used in a transaction approval model of an authorizing entity such as issuers or acquirers for enhancing approval rates of payment processing requests while mitigating fraudulent transactions.

BACKGROUND

Payment networks enable various types of payment transactions where a consumer or a cardholder buys a product/service with or without the presence of a physical payment card (e.g., debit card, credit card, prepaid card, etc.). In such transactions, the payment card information is transmitted from a merchant. In one example, the payment transaction includes online transactions, where the cardholder utilizes a personal device to access a merchant website, and the cardholder selects one or more products on the merchant website that the cardholder wishes to purchase. Another example of the payment transaction includes over-the-phone transactions, where the cardholder keys in or verbally states their payment card information. During the checkout processing, the cardholder provides payment account information, such as a credit-card or debit-card number, to the merchant. The merchant then generates a payment authorization request using the payment card information of the cardholder, and the payment authorization request is communicated to an issuer for processing.

In certain scenarios, it is noted that such payment transactions may be declined by the issuer due to various reasons (such as incorrect cardholder input, high fraud score, insufficient funds availability, etc.) frequently when compared to the payment transactions performed using offline methods such as a Point of Sale (POS) payment transactions.

Further, due to fraudsters, the payment transactions are not completely secure and the merchants are advised to take additional precautions when accepting the payment transactions to avoid any liabilities such as chargeback. Even, issuers also utilize certain authentication models or fraud scoring models for payment transactions that may sometime decline legitimate payment transactions as well. It should be understood that declining legitimate payment transaction leads to significant losses in financial revenue for everyone in the payment ecosystem, i.e., the issuer, the merchant, and the acquirer. Further, wrongfully declined transactions may also lead to huge intangible and adverse effects, as such unexpected declined payments will discourage and disappoint legitimate cardholders who may avoid relying on their payment cards to perform future payment transactions. In some scenarios, cardholders may avoid using a particular payment card, if they experience many such declinations. Therefore, eroding cardholder trust thus, leads them to stay away from using the particular payment card from the issuer for months or more and they may even never use that particular payment card again.

Thus, there exists a technological need for technical solutions to help increase transaction approval rates of the transactions while also reducing fraudulent activities.

SUMMARY

Various embodiments of the present disclosure provide methods and systems for increasing the transaction approval rate of a payment transaction.

In an embodiment, a computer-implemented method is disclosed. The computer-implemented method performed by a server system includes accessing a set of payment transaction features corresponding to a plurality of historical payment transactions from a transaction database. The method further includes determining via a fraud model, a first set of rank-ordered payment transaction features based, at least in part, on a first set of shapley additive explanations (SHAP) values. Each of the first set of rank-ordered payment transaction features indicates the contribution of corresponding payment transaction feature in predicting whether the payment transaction from the plurality of historical payment transactions is fraudulent or non-fraudulent. The method further includes determining via an approval model, a second set of rank-ordered payment transaction features based, at least in part, on a second set of SHAP values. Each of the second set of rank-ordered payment transaction features indicates the contribution of corresponding payment transaction feature in predicting whether the payment transaction from the plurality of historical payment transactions is approved or declined. The method further includes computing a difference in ranks of payment transaction features based, at least in part, on the first set of rank-ordered payment transaction features and the second set of rank-ordered payment transaction features. The method further includes determining a set of utilized transaction features and a set of unutilized transaction features based, at least in part, on the difference in ranks of payment transaction features.

The method further includes generating a simulated authorizing model, based at least in part on the set of utilized transaction features. The method further includes computing simulated transaction approval rate and simulated fraud transaction rate for the simulated authorizing model based, at least in part, on the plurality of historical payment transactions. The method further includes generating a plurality of proxy authorization models based, at least in part, on the set of unutilized transaction features. The method further includes computing transaction approval rates and fraud transaction rates for each of the plurality of proxy authorization models based, at least in part, on the plurality of historical payment transactions. The method further includes computing an increase in transaction approval rate and a change in fraud transaction rate for each of the plurality of proxy transaction approval models based, at least in part, on comparing the transaction approval rates and the fraud transaction rates with the simulated transaction approval rate and the simulated fraud transaction approval rate. The method further includes determining one or more recommended transaction features from the set of unutilized transaction features upon determining that the increase in transaction approval rate and the change in fraud transaction rate is more than a predetermined threshold. The method further includes transmitting the one or more recommended transaction features to an authorizing entity.

In another embodiment, a server system is disclosed. The server system includes a communication interface and a memory including executable instructions. The server system also includes a processor communicably coupled to the memory. The processor is configured to execute the instructions to cause the server system, at least in part, to access a set of payment transaction features corresponding to a plurality of historical payment transactions from a transaction database. The server system is caused to determine via a fraud model, a first set of rank-ordered payment transaction features based, at least in part, on a first set of shapley additive explanations (SHAP) values. Each of the first set of rank-ordered payment transaction features indicates the contribution of corresponding payment transaction feature in predicting whether the payment transaction from the plurality of historical payment transactions is fraudulent or non-fraudulent. The server system is caused to determine via an approval model, a second set of rank-ordered payment transaction features based, at least in part, on a second set of SHAP values. Each of the second set of rank-ordered payment transaction features indicates the contribution of corresponding payment transaction feature in predicting whether the payment transaction from the plurality of historical payment transactions is approved or declined. The server system is caused to compute a difference in ranks of payment transaction features based, at least in part, on the first set of rank-ordered payment transaction features and the second set of rank-ordered payment transaction features. The server system is caused to determine a set of utilized transaction features and a set of unutilized transaction features based, at least in part, on the difference in ranks of payment transaction features.

The server system is caused to generate a simulated authorizing model, based at least in part on the set of utilized transaction features. The server system is caused to compute simulated transaction approval rate and simulated fraud transaction rate for the simulated authorizing model based, at least in part, on the plurality of historical payment transactions. The server system is caused to generate a plurality of proxy authorization models based, at least in part, on the set of unutilized transaction features. The server system is caused to compute transaction approval rates and fraud transaction rates for each of the plurality of proxy authorization models based, at least in part, on the plurality of historical payment transactions.

The server system is caused to compute an increase in transaction approval rate and a change in fraud transaction rate for each of the plurality of proxy transaction approval models based, at least in part, on comparing the transaction approval rates and the fraud transaction rates with the simulated transaction approval rate and the simulated fraud transaction approval rate. The server system is caused to determine one or more recommended transaction features from the set of unutilized transaction features upon determining that the increase in transaction approval rate and the change in fraud transaction rate is more than a predetermined threshold. The server system is caused to transmit the one or more recommended transaction features to an authorizing entity.

In yet another embodiment, a non-transitory computer-readable storage medium is disclosed. The non-transitory computer-readable storage medium includes computer-executable instructions that, when executed by at least a processor of a server system, cause the server system to perform a method. The method includes accessing a set of payment transaction features corresponding to a plurality of historical payment transactions from a transaction database. The method further includes determining via a fraud model, a first set of rank-ordered payment transaction features based, at least in part, on a first set of shapley additive explanations (SHAP) values. Each of the first set of rank-ordered payment transaction features indicates the contribution of corresponding payment transaction feature in predicting whether the payment transaction from the plurality of historical payment transactions is fraudulent or non-fraudulent. The method further includes determining via an approval model, a second set of rank-ordered payment transaction features based, at least in part, on a second set of SHAP values. Each of the second set of rank-ordered payment transaction features indicates the contribution of corresponding payment transaction feature in predicting whether the payment transaction from the plurality of historical payment transactions is approved or declined. The method further includes computing a difference in ranks of payment transaction features based, at least in part, on the first set of rank-ordered payment transaction features and the second set of rank-ordered payment transaction features. The method further includes determining a set of utilized transaction features and a set of unutilized transaction features based, at least in part, on the difference in ranks of payment transaction features.

The method further includes generating a simulated authorizing model, based at least in part on the set of utilized transaction features. The method further includes computing simulated transaction approval rate and simulated fraud transaction rate for the simulated authorizing model based, at least in part, on the plurality of historical payment transactions. The method further includes generating a plurality of proxy authorization models based, at least in part, on the set of unutilized transaction features. The method further includes computing transaction approval rates and fraud transaction rates for each of the plurality of proxy authorization models based, at least in part, on the plurality of historical payment transactions. The method further includes computing an increase in transaction approval rate and a change in fraud transaction rate for each of the plurality of proxy transaction approval models based, at least in part, on comparing the transaction approval rates and the fraud transaction rates with the simulated transaction approval rate and the simulated fraud transaction approval rate. The method further includes determining one or more recommended transaction features from the set of unutilized transaction features upon determining that the increase in transaction approval rate and the change in fraud transaction rate is more than a predetermined threshold. The method further includes transmitting the one or more recommended transaction features to an authorizing entity.

BRIEF DESCRIPTION OF THE FIGURES

For a more complete understanding of example embodiments of the present technology, reference is now made to the following descriptions taken in connection with the accompanying drawings in which:

FIGS. 6A-6D, collectively, illustrate a comparative analysis of simulation of the use of authorization products on the transaction data to recommend the best suitable products to increase the approval rates, in accordance with an embodiment of the present disclosure;

Figure 1:
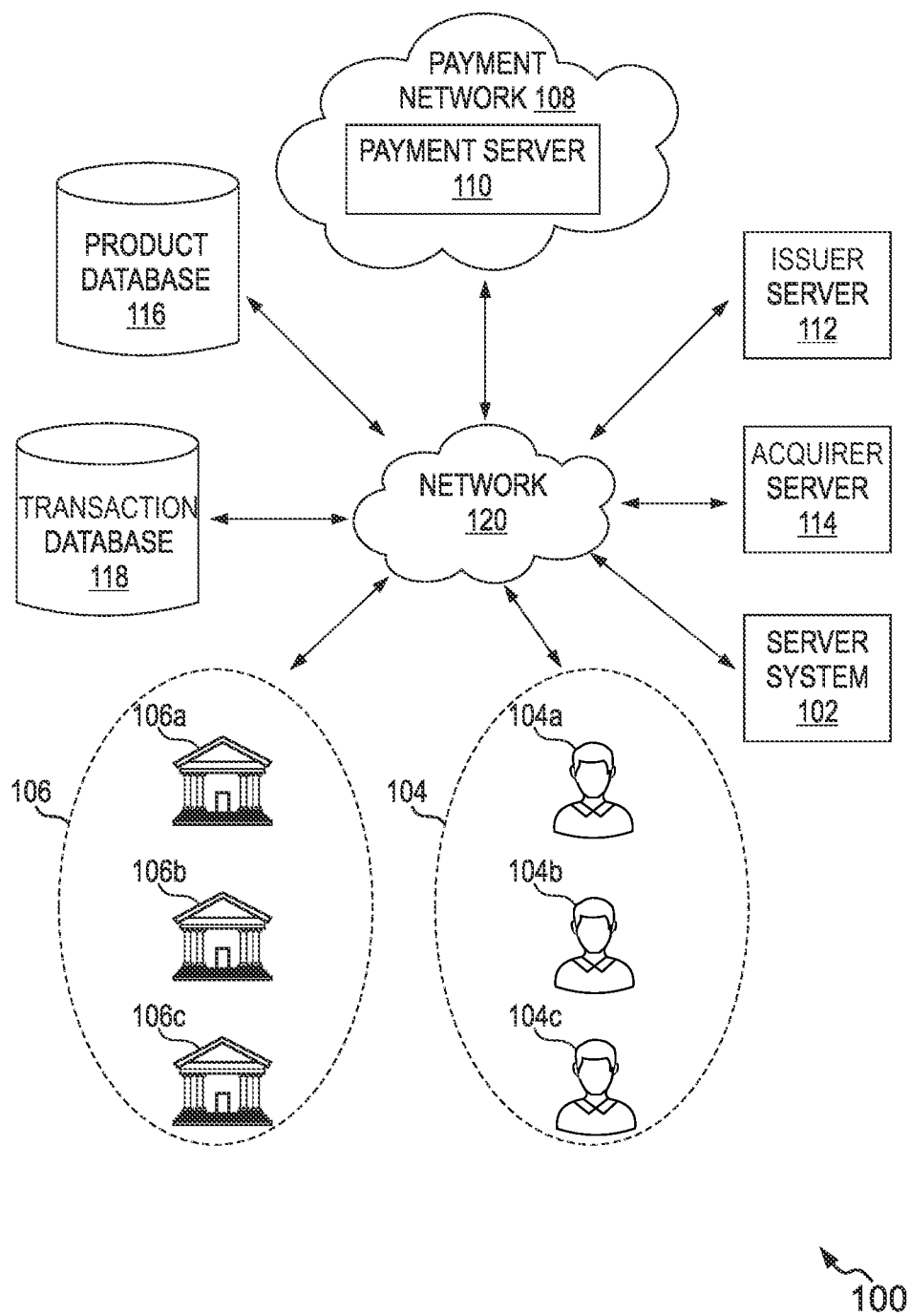
FIG. 1 illustrates an exemplary representation of an environment related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "payment account" used throughout the description refers to a financial account that is used to fund a financial transaction (interchangeably referred to as "card-not-present payment transaction"). Examples of the financial account include, but are not limited to, a savings account, a credit account, a checking account, and a virtual payment account. The financial account may be associated with a cardholder such as an individual person, a family, a commercial cardholder, a company, a corporation, a governmental cardholder, a non-profit organization, and the like. In some scenarios, a financial account may be a virtual or temporary payment account that can be mapped or linked to a primary financial account, such as those accounts managed by payment wallet service providers, and the like.

The term "payment network", used herein, refers to a network or collection of systems used for the transfer of funds through the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes that may include payment cards, letters of credit, checks, financial accounts, etc. Examples of networks or systems configured to perform as payment networks include those operated by such as Mastercard®.

The term "merchant", used throughout the description generally refers to a seller, a retailer, a purchase location, an organization, or any other cardholder that is in the business of selling goods or providing services, and it can refer to either a single business location or a chain of business locations of the same cardholder.

The terms "cardholder" and "customer" are used interchangeably throughout the description and refer to a person who holds a credit or a debit card that will be used by a merchant to perform a card-not-present (CNP) payment transaction.

The term "products" or "authorizing components", used throughout the description generally refers to a number of services or products offered by Mastercard® or any third-party entities which can be helpful for issuers/merchants to make authorization decisions for various types of payment transactions. For example, an Automatic Billing Updater (ABU) is a product offered by Mastercard® for acquirers or merchants. This product includes helpful tables correlating old and new account numbers (e.g., for payment card accounts) when an account restructuring (such as, card expirations) has taken place.

Various embodiments of the present disclosure provide methods, systems, user devices, and computer program products for recommending significant transaction features and authorization components or products to issuers/merchants/acquirers, for payment transactions that increase transaction approval rates while minimizing fraud rates or maintaining the same fraud rate. A neural network model (e.g., Deep factorization machine (FM) with entity embedding model) is utilized for predicting a likelihood of a particular transaction to be approved (which might have been previously declined) based on a) transaction features of the particular transaction and b) applying various products on the particular transaction during simulations. Since the information related to the features presently being used by an issuer is unknown, simulations or experiments are set up to create a simulated authorizing model (by predicting the transaction features used by the issuer/acquirer to build their own model, i.e., utilized transaction features). It should be understood that for detecting the utilized transaction features, Shapley additive explanations (SHAP) values are used. Further, a proxy transaction approval model may be made using other significant transaction features, i.e., unutilized transaction features such that it can enhance the present approval model or fraud detection models used by the issuer/acquirer at their end. If an improvement in the transaction approval rate due to the application of one or more transaction features from the unutilized transaction features is determined, then a recommendation for using such transaction features can be shared with the issuer/acquirer. In an example, SHAP values of the transaction features are calculated for an approval model based on experiment approval decision and an approval model fraud model (i.e., the simulated authorizing model) based on actual fraud decisions made historically by the issuer/acquirer. The difference in ranks based on the SHAP values of both models helps in determining significant transaction features and is used to increase approval rates of payment transactions. The SHAP values of the transaction features are calculated at the transaction level. Similarly, the effect of one or more authorizing components or products on the overall transaction approval rate of the simulated authorizing model is computed. Then, if one or more or a combination of authorizing components shows an increase in the overall approval rate, a recommendation for using such authorizing products or a combination thereof can be shared with the issuer/acquirer.

To that end, the techniques of the present disclosure enable the issuer/acquirer to enhance their preexisting authorizing models based on the recommended transaction features and authorizing components, thus, improving the transaction approval rate while reducing false transaction decline. Further, the fraud rate may also be reduced by implementing the recommended transaction features and authorizing components in their preexisting authorizing models.

Various example embodiments of the present disclosure are described hereinafter with reference to FIGS. 1 to 10.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, determining an optimal combination of products or significant transaction features needed to be applied on a payment transaction, thereby resulting in high approval rates for a payment transaction, reducing financial fraud, etc.

The environment 100 generally includes a server system 102, a plurality of cardholders 104a, 104b, and 104c (collectively represented as cardholder 104), a plurality of merchants 106a, 106b, and 106c (collectively represented as merchant 106), a payment network 108 including a payment server 110, an issuer server 112, an acquirer server 114, a product database 116 and a transaction database 118, each coupled to, and in communication with (and/or with access to) a network 120. The network 120 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among two or more of the parts or cardholders illustrated in FIG. 1, or any combination thereof.

Various entities in the environment 100 may connect to the network 120 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, future communication protocols or any combination thereof. For example, the network 120 may include multiple different networks, such as a private network made accessible by the server system 102 and a public network (e.g., the Internet, etc.) through which the server system 102, the issuer server 112, the acquirer server 114, and the payment server 110 may communicate.

In one embodiment, the server system 102 is configured to provide a transaction feature recommendation to the issuer server 112 or the acquirer server 114 along with a payment authorization request. The transaction feature recommendation includes information regarding one or more recommended transaction features that may be applied by the issuer server 112 or the acquirer 114 to their existing authorization model while determining whether a payment transaction is genuine or fraudulent for increasing the transaction approval rate.

In one embodiment, the server system 102 is configured to provide a product recommendation or authorizing component recommendation to the issuer server 112 or acquirer server 114 along with a payment authorization request. The authorizing component recommendation includes information regarding one or more recommended authorizing components that may be applied by the issuer server 112 or the acquirer 114 to their existing authorization strategy while determining whether a payment transaction is genuine or fraudulent for increasing the transaction approval rate.

The server system 102 is a separate part of the environment 100, and may operate apart from (but still in communication with, for example, via the network 120) the payment server 110, the issuer server 112, the acquirer server 114, and any third-party external servers (to access data to perform the various operations described herein). However, in other embodiments, the server system 102 may be incorporated, in whole or in part, into one or more parts of the environment 100, for example, the payment server 110. In addition, the server system 102 should be understood to be embodied in at least one computing device in communication with the network 120, which may be specifically configured, via executable instructions, to perform steps as described herein, and/or embodied in at least one non-transitory computer-readable media.

In one embodiment, a plurality of cardholders 104a, 104b, and 104c is associated with the issuer server 112. In one embodiment, a plurality of merchants 106a, 106b, and 106c are associated with the acquirer server 114.

A cardholder 104 may operate a cardholder device (not shown in the figure) to conduct an online payment transaction through a payment gateway application. Examples of the cardholder device include, but are not limited to, a personal computer (PC), a mobile phone, a tablet device, a Personal Digital Assistant (PDA), a voice-activated assistant, a Virtual Reality (VR) device, a smartphone, and a laptop. The cardholder 104 may be any individual, or representative of a corporate cardholder, non-profit organization, or any other person. In one example, while performing a card-not-present (CNP) transaction, the cardholder 104 enters the payment card information associated with a payment card into a web browser and submits the payment card information to the merchant 106. In one exemplary scenario, the merchant 106 may store the payment card information in a database and/or a server for performing card-on-file payment transactions (i.e., an example of the CNP transaction). In other words, the cardholder 104 authorizes the merchant 106 to store the card details of the cardholder 104 and to bill the cardholder 104 for recurring transactions using the stored card details.

The cardholder 104 may have a payment account issued by an issuing bank (associated with the issuer server 112) and may be provided the payment card with financial or other account information encoded onto the payment card such that the cardholder 104 may use the payment card to initiate and complete a transaction using a bank account at the issuer server 112.

The issuer server 112 is a computing server that is associated with the issuer bank. The issuer bank is a financial institution that manages accounts of multiple cardholders. Account details of the accounts established with the issuer bank are stored in cardholder profiles of the cardholders 104 in a memory of the issuer server 112 or on a cloud server associated with the issuer server 112. On receipt of the payment authorization request, the issuer 112 checks cardholder's ID and may also undertake other checks (e.g., fraud checking). Based on these checks, the issuer 112 may approve/decline the payment transaction and generate a payment authorization response. The terms "issuer", "issuer bank", "issuing bank" or "issuer server" will be used interchangeably herein.

The merchant 106 may have a payment account issued by an acquiring bank (associated with the acquirer server 114) to receive a payment from the cardholder 104. The acquirer server 114 is a computing server that is associated with the acquirer bank. The acquirer bank is a financial institution that manages accounts of multiple merchants. Account details of the accounts established with the acquirer bank are stored in merchant profiles of the merchants 106 in a memory of the acquirer server 114 or on a cloud server associated with the acquirer server 114. On receipt of the payment authorization request, the acquirer 114 checks merchant's ID and may also undertake other checks (e.g., fraud checking). Based on these checks, the acquirer 114 may approve/decline the payment transaction and share the payment authorization request with the issuer server 112. The terms "acquirer", "acquirer bank", "acquiring bank" or "acquirer server" will be used interchangeably herein To improve the authorization decision-making of the payment transactions, the issuer 112 and/or the acquirer 114 may utilize one or more authorizing components (i.e., services and products) offered by a payment processor such as Mastercard® or any other third parties that may also be useful in connection with one or more embodiments of the present disclosure. Examples of the authorizing components are, but not limited to, decision intelligence (DI), Mastercard Digital Enablement Service (MDES), Automatic Billing Updater (ABU), Stand-In (SI), fraud rules manager (FRM), 3D Secure (3DS), etc.

The issuers 112 and/or acquirers 114 may apply available authorizing components to payment transactions for improving the authorization decision of the payment transactions. Since there is a wide variety of authorizing components available, it is difficult for the issuers 112 and/or acquirers 114 to predict which authorizing components would likely decrease the decline rates (i.e., improve the approval rates) while either reducing the fraud rate or with the same fraud rate. Further, each authorizing component may handle payment authorization requests of a particular transaction type. Thus, it is required that the issuers 112 and/or acquirers 114 know which all authorizing components to apply so that the approval rate is maximized and the fraud rate is minimized. Further, the authorization model used by the issuers 112 or the acquirers 114 may not be capable of accurately determining the fraud score of a particular transaction type. Thus, it is required that the issuers 112 or acquirers 114 may not be capable of accurately determining which transaction features are significant for making a correct approval decision.

To overcome the above limitations, the server system 102 is configured to identify one or more significant transaction features along with one or more optimal authorizing components (i.e., products) or a combination thereof to be applied to each payment transaction (i.e., CNP/e-commerce payment transaction), proactively. In particular, the server system 102 is configured to predict the optimal combination of authorizing components (i.e., products) for each payment transaction by utilizing an Artificial intelligence (AI) or machine learning (ML) model such as a deep learning model with a factorization machine (FM) model along with other methods such as SHAP values to provide a transaction feature recommendation and an authorizing component recommendation to the issuers 112 and/or acquirers 114 in real-time.

In one embodiment, the transaction database 118 is a central repository of data that is created by storing payment transaction data including a plurality of historical payment transactions from transactions occurring between the acquirers 114 and issuers 112 associated with the payment network 108. The transaction database 118 stores historical payment transaction data along with real-time payment transaction data of a plurality of merchants. The payment transaction data may include, but is not limited to, payment transaction attributes, such as transaction identifier, merchant name, merchant identifier, merchant category code (MCC), cross-border transaction flag, payment card type (debit/credit/prepaid), card product type, transaction channel (such as e-commerce, recurring, POS), card-not-present (CNP) transaction flag, response code flag (approve/decline), decline reason code (in case of the declined transaction). In one embodiment, the transaction database 118 may also store a product flag vector along with each payment transaction. The product flag vector indicates which authorizing components (i.e., products) were applied to each payment transaction by the issuers 112 or acquirer 114.

In one embodiment, the product database 116 is configured to store information of all available authorizing components offered by another entity such as a payment processor. In other words, the product database 116 stores software algorithms associated with each authorizing component.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

Figure 2:
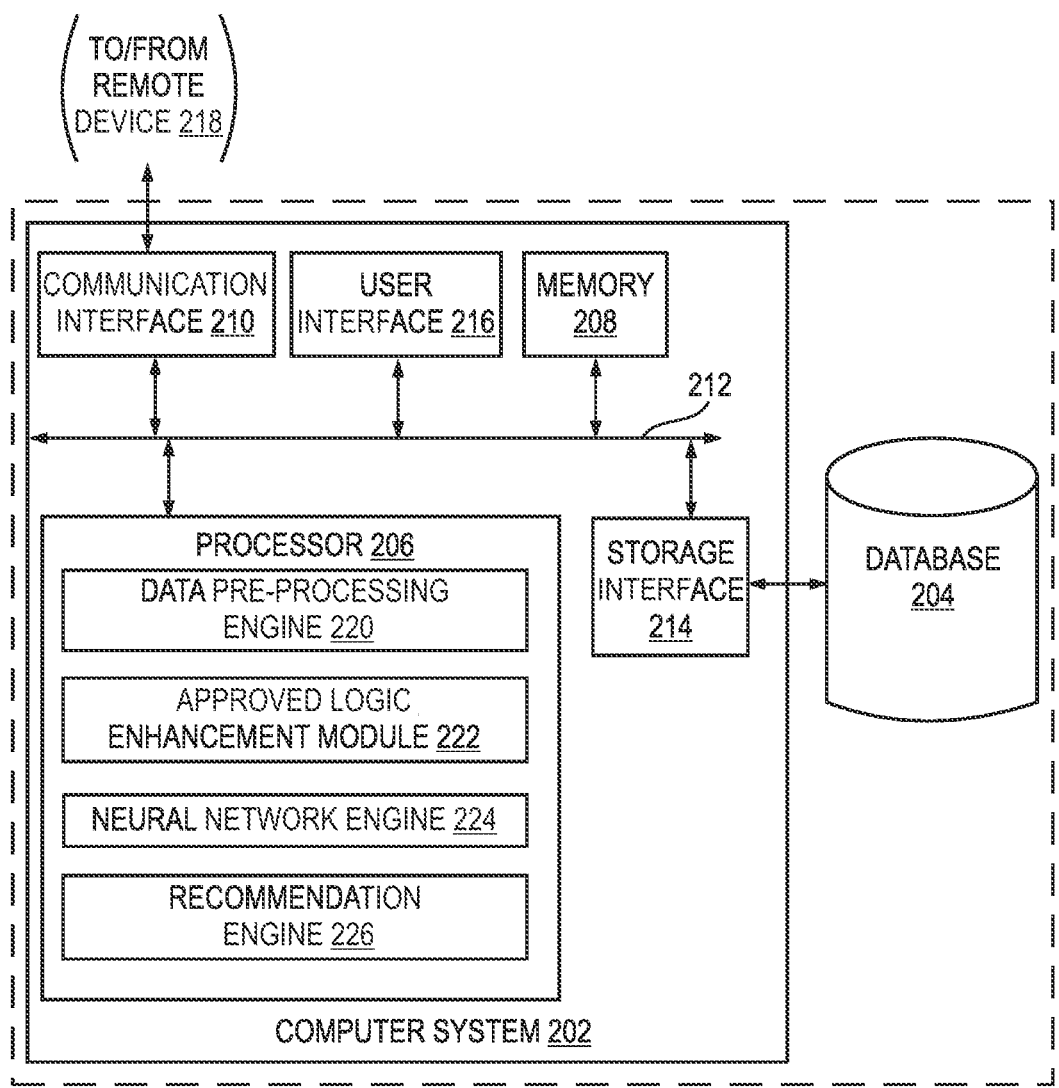
FIG. 2 illustrates a simplified block diagram of a server system, in accordance with an embodiment of the present disclosure.

FIG. 2 illustrates a simplified block diagram of a server system 200, in accordance with an embodiment of the present disclosure. The server system 200 is similar to the server system 102. In some embodiments, the server system 200 is embodied as a cloud-based and/or SaaS-based (software as a service) architecture. In one embodiment, the server system 200 is a part of the payment network 108 or is integrated within the payment server 110. In another embodiment, the server system 200 is embodied within the issuer server 112. In another embodiment, the server system 200 is embodied within the acquirer server 114.

The server system 200 includes a computer system 202 and a database 204. The computer system 202 includes at least one processor 206 for executing instructions, a memory 208, a communication interface 210, a storage interface 214, and a user interface 216 that communicate with each other via a bus 212.

In some embodiments, the database 204 is integrated within computer system 202. For example, the computer system 202 may include one or more hard disk drives as the database 204. A storage interface 214 is any component capable of providing the processor 206 with access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204.

Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the server system 200, as described herein. In another embodiment, the memory 208 may be realized in the form of a database server or cloud storage working in conjunction with the server system 200, without departing from the scope of the present disclosure.

The processor 206 is operatively coupled to the communication interface 210 such that the processor 206 is capable of communicating with a remote device 218 such as, the merchant 106, or communicated with any cardholder connected to the network 120 (as shown in FIG. 1). It is noted that the server system 200 as illustrated and hereinafter described is merely illustrative of an apparatus that could benefit from embodiments of the present disclosure and, therefore, should not be taken to limit the scope of the present disclosure. It is noted that the server system 200 may include fewer or more components than those depicted in FIG. 2.

In one embodiment, the processor 206 includes a data pre-processing engine 220, an approved logic enhancement module 222, a neural network engine 224, and a recommendation engine 226. It should be noted that the components, described herein, can be configured in a variety of ways, including electronic circuitries, digital arithmetic and logic blocks, and memory systems in combination with software, firmware, and embedded technologies.

The data pre-processing engine 220 includes suitable logic and/or interfaces for receiving a real-time payment transaction request (i.e., payment authorization request) for a payment transaction between the cardholder 104 and the merchant 106. For instance, a cardholder 'A' purchases a product by accessing a merchant website 'ABC.com'. On the payment interface, the cardholder 'A' enters card details (such as, card number, cardholder's name, card expiration date, CVV) of the payment card, and then the merchant sends a payment transaction request to an acquirer who sends a payment authorization request to an issuer 112 associated with the cardholder 104 based on the card details.

The data pre-processing engine 220 is configured to access or extract a set of payment transaction features from various data points of historical payment transaction data. In an embodiment, the set of payment transaction features may be accessed from a plurality of historical transactions located within a database (such as transaction database 118). In one non-limiting example, each of the set of payment transaction features corresponds to a particular payment transaction from the plurality of historical payment transactions including at least one of or a combination of the issuer and merchant features, transaction features, card features, security protocol, interaction features, and authentication status. The issuer and merchant features may include the region/country in which the issuer and acquirer are situated, whether the transaction is domestic or cross border, the merchant category code, the merchant name, the merchant region, etc. The transaction features may include the transaction amount, the currency at which the transaction is made, the time of the transaction, the transaction channel (i.e., whether it is an e-commerce or recurring transaction), etc. The card features may include whether the card is a debit, credit, or prepaid card, the BIN (i.e., last 6 digits of a card) to which the card belongs, origination date, etc. The security protocols may include features that are related to various security protocols related to transactions for example, whether a customer entered the CVC2 pin correctly, whether the issuer is properly utilizing the 3D-Secure Solution before authenticating a transaction, etc. The interaction features are the features that are derived variables formed based on interaction among the above-mentioned features. The authentication status may include the features that indicate whether a transaction was approved or declined during the authentication process or later reported as fraud by the cardholder.

In one embodiment, the data pre-processing engine 220 is further configured to generate or extract a payment transaction data from various data points of the payment authorization request. In an embodiment, the set of payment transaction features may be accessed from a plurality of historical transactions located within a database (such as transaction database 118). In a non-limiting example, the payment transaction data may include but is not limited to, transaction details, merchant details, authentication details, and enabled authorizing components details. The transaction details may further include details regarding, but are not limited to, transaction amount, card on file, recurring payment, cross border indicator, product type, P2P indicator, etc. The merchant details may further include details regarding but are not limited to, merchant country, currency conversion, merchant category code (MCC), etc. The authentication details may further include details regarding, but are not limited to, Security Level Indicator (SLI) value, OB5 and Account Authentication Value (AVV) results, Authorization IQ scores, etc. The enabled authorizing components details may further include details regarding, but not limited to, Mastercard product decision intelligence, CVC2, Address Verification Service (AVS), etc. that are enabled by the issuer 112 or acquirer 114 while processing a particular payment transaction.

In one embodiment, the data pre-processing engine 220 is configured to randomly select all historical payment transaction data (i.e., payment authorization request and payment authorization response messages of past payment transactions) associated with the issuer 112 and/or the acquirer 114 for training the neural network engine 224. The past transaction-level data associated with the issuer 112 and/or the merchant 106 is stored in the transaction database 118. In other words, the data pre-processing engine 220 is configured to access historical transactions and authorizing components (i.e., products) that were applied by the issuer 112 or the acquirer 114 while processing a particular payment transaction. The historical payment transaction data associated with the issuer 112 or the acquirer 114 may further include a number of declined/approved/fraud transactions such that the neural network engine 224 learns the appropriate representation of the transactional data associated with the issuer 112 or the acquirer 114.

In one embodiment, the data pre-processing engine 220 is configured to filter the historical payment transaction data with some data constraints (such as, transaction type: card-not-present, decline reason code: addressable declines, issuer, acquirer and/or merchant geographical region: for example, USA).

The approved logic enhancement module 222 includes suitable logic and/or interfaces for determining a set of utilized transaction features or variables that can enhance the pre-existing approval logic of the issuer 112 or acquirer 114. In one non-limiting example, the approval logic may be used to implement an authorization model for authorizing payment transactions. In an example, the pre-existing authorization model may be an AI or ML model. The approved logic enhancement module 222 uses SHapley Additive explanations (SHAP) values to detect unutilized transaction features or variables that can enhance the present approval logic of the issuer 112 and/or the acquirer 114. In particular, the approved logic enhancement module 222 may determine a first set of rank-ordered payment transaction features based, at least in part, on shapley additive explanations (SHAP) values. In one example, the determination of the first set of rank-ordered payment transaction features may be done via an AI or ML model such as a fraud model (described later in the present disclosure). Each of the first set of rank-ordered payment transaction features may indicate the significance or contribution of a payment transaction feature accessed by the data pre-processing engine 220 in predicting whether a particular payment transaction from the plurality of historical payment transactions is fraudulent or non-fraudulent.

Further, the approved logic enhancement module 222 is configured to determine a second set of rank-ordered payment transaction features based, at least in part, on the SHAP values. It should be understood the SHAP values may either be the same or different than the SHAP values used to determine the first set of rank-ordered payment transaction features. In one example, the determination of the first set of rank-ordered payment transaction features may be done via an AI or ML model such as an approval model (described later in the present disclosure). Each of the second set of rank-ordered payment transaction features indicates the significance or contribution of a payment transaction feature in predicting whether a particular payment transaction from the plurality of historical payment transactions is approved or declined.

Then, the approved logic enhancement module 222 is configured to compute a difference in ranks of payment transaction features from the first set of rank-ordered payment transaction features and the second set of rank-ordered payment transaction features. On the basis of the difference in ranks of payment transaction features, the approved logic enhancement module 222 determines a set of utilized transaction features and a set of unutilized transaction features. The set of utilized and unutilized transaction features represents the transaction features that have been used by the issuer 112 or acquirer 114 to develop their pre-existing model. In an embodiment, the approved logic enhancement module 222 may generate a simulated authorizing model that is indicative of the pre-existing model of the issuer 112 or the acquirer 114 based at least in part on the set of utilized transaction features. In some scenarios, the approved logic enhancement module 222 may validate the simulated authorizing model, based at least in part on the plurality of historical payment transactions. For example, historical payment transaction data may be used as an input for the simulated authorizing model and the output of the simulated authorizing model may be validated against the actual transaction known approval or decline data from the historical payment transaction data.

In another embodiment, the approved logic enhancement module 222 is further configured to generate a plurality of proxy authorization models based, at least in part, on the set of unutilized transaction features. Further, the approved logic enhancement module 222 computes a set of transaction approval rates and a set of fraud approval transaction rates for the proxy authorization models based at least in part on historical payment transactions. Then, the approved logic enhancement module 222 computes an increase in transaction approval rate and a change in fraud transaction rate for each of the proxy transaction approval models based, at least in part, on comparing the set of transaction approval rates and the set of fraud transaction rates of the proxy transaction approval models with the transaction approval rate and the fraud transaction approval rate of the simulated authorization model. In some embodiments, the increase in transaction approval rate and the change in fraud transaction rate may be adjusted appropriately based on an addressability criterion. The addressability criterion may be determined on the basis of a set of industry-specific security protocols based on internal policies of the issuer 112, the acquirer 114, and/or a payment processor.

Then, the approved logic enhancement module 222 determines one or more recommended transaction features from the set of unutilized transaction features. In particular, the one or more recommended transaction features are determined upon determining the increase in transaction approval rate and the change in fraud transaction rate of the plurality of proxy transaction approval models in more than a predetermined threshold. In a non-limiting, the predetermined threshold may indicate an increase in transaction approval rate by 10% and a change in fraud transaction rate of 0 to negative 5% (i.e., either no change or a reduction). Therefore, if the increase in transaction approval rate and the change in fraud transaction rate of a proxy authorization model is 11% and negative 7%, then these unutilized transaction features will be shared with the issuer 112 or acquirer 114 as one or more recommended transaction features. In another embodiment, the predetermined threshold may further include an approval score that represents the probability of a particular transaction being approved or declined. For example, a score of zero depicts that a transaction will be declined while a score of one will depict that the transaction will be approved. In an embodiment, the predetermined threshold may indicate an approval score of 0.5, i.e., a transaction with an approval score below 0.5 will be declined.

It should be noted that the approved logic enhancement module 222 provides an agnostic and robust implementation of SHAP (SHapley Additive explanations) values to uncover the extent to which transaction features are not appropriated by the pre-existing authorization model implemented by the issuers 112 or acquirers 114 in their decision making regarding transaction approval or declines. This 'knowledge' is significant information for designing intelligent or adversarial attacks. Thus, this information can be used by any financial institute as an active preventive measure (a) to shield their authentication system from adversarial attacks and, also (b) to reduce false declines to prevent a suboptimal customer experience amounting to both revenue and reputation loss for entities across the payment value chain.

The neural network engine 224 includes suitable logic and/or interfaces for predicting a combination of one or more authorizing components (i.e., products) that may be applied to a particular payment transaction in real-time to improve the likelihood of approval without increasing the transaction fraud rate. In an embodiment, the neural network engine 224 implements a deep neural network model (for example, a Deep Factorization Machine (DeepFM) model). In a non-limiting example, the neural network engine 224 is trained using the payment transaction attributes associated with the plurality of historical payment transactions with declined/approved authorization responses.

Once the DeepFM model is trained based on the payment transaction attributes associated with the plurality of historical transaction data, the neural network engine 224 can predict what authorizing components (i.e., products) should be applied to a particular payment transaction in real-time to increase the transaction approval rate based at least in part on the payment transaction attributes extracted from the payment authorization request for a real-time payment transaction. In a non-limiting example, the payment transaction attributes may include at least one of: transaction amount, card on file indicator, recurring payment indicator, cross border indicator, product type, P2P indicator, merchant country, currency conversion, merchant category code (MCC), Security Level Indicator (SLI) value, OB5 and Account Authentication Value (AVV) results, Authorization IQ scores, enabled authorizing components details, and the like. The enabled authorizing components details indicate the authorizing components that are already enabled by the issuer 112 and/or acquirer 114 at the time of generating the payment authorization request.

In one embodiment, the neural network engine 224 is configured to determine or predict a set of transaction approval rates for a payment transaction. Each of the set of transaction approval rates indicates a transaction approval rate when one or more authorizing components are applied to the real-time payment transaction. The DeepFM model attributes the marginal impact of various payment transaction attributes on transaction approvals and further, the DeepFM model identifies the benefits that one or more authorizing components or a combination thereof might bring to the overall transaction approval rate for the particular payment transaction. In a non-limiting example, the deepFM model may be an AI or ML model that integrates the architectures of factorization machine (FM) and deep neural networks (DNN). In an implementation, the DeepFM model is configured to learn both low and high-order feature interactions, i.e., it models low-order feature interactions using FM and models high-order feature interactions using DNN (described further in detail later in the present disclosure).

The recommendation engine 226 includes suitable logic and/or interfaces for generating an authorizing component recommendation to the issuer 112 and/or acquirer 114. The authorizing component recommendation may be generated based at least in part on the set of transaction approval probability scores.

The recommendation engine 226 is configured to run simulations of one or more authorizing components being applied to the transactions to provide product recommendation strategies to improve the transaction approval rate and to ensure that there's no increase in the fraud rate of the transaction. The recommendation engine 226 simulates the declined transaction rate to determine products to apply to increase the approval rate. The recommendation engine 226 simulates approved transaction data from the plurality of historical payment transaction data to check if any fraudulent transactions are being approved. In other words, the recommendation engine 226 may validate the authorizing component recommendation based at least in part on determining an increase in the transaction approval rate for the particular payment transaction upon enabling the recommended authorizing components during the authorization process when compared with the transaction approval rate of the simulated issuer authentication model. Similarly, validation may be done for the fraud transaction rate upon using the recommended authorizing components through a comparison with the fraud transaction approval rate of the simulated authorization model.

In another embodiment, the recommendation engine 226 is configured to transmit the authorizing component recommendation to the issuer 112 or the acquirer 114 in real-time. Upon receiving the recommendation, the issuer 112 or acquirer 114 may apply the one or more authorizing components included in the authorizing component recommendation to the payment transaction, resulting in high approval rates, low fraud risks, and maximized revenues for issuers 112, acquirers 114 and/or merchants 106. In another embodiment, the recommendation engine 226 is configured to transmit the one or more recommended transaction features to the issuer 112 or the acquirer 114 in real-time. Upon receiving the recommendation, the issuer 112 or acquirer 114 may apply the one or more recommended transaction features to their internal payment authorizing model, resulting in high approval rates, low fraud risks, and maximizing revenues for issuers 112, acquirers 114, and/or merchants 106.

Figure 3:
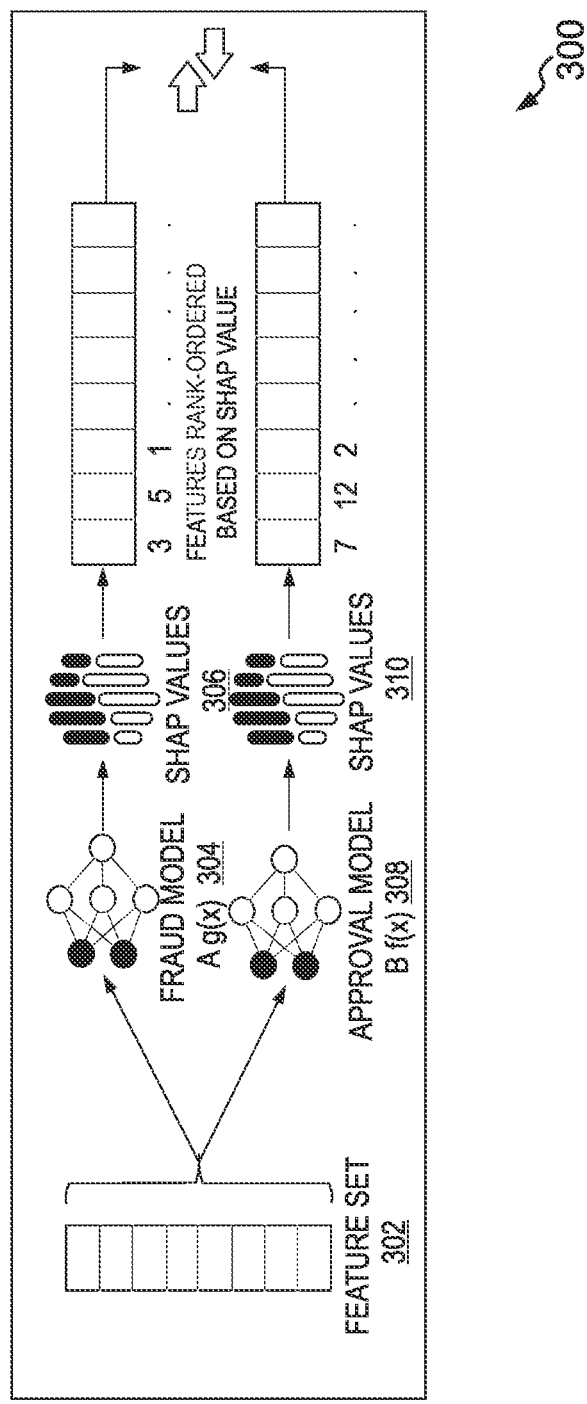
FIG. 3 illustrates a schematic block diagram representation for detecting significant features or variables that can enhance the pre-existing approval logic of the authorizing entity using SHAP values, in accordance with an embodiment of the present disclosure.

FIG. 3 illustrates a schematic block diagram representation 300 for detecting significant features or variables that can enhance the pre-existing approval logic of the authorizing entity using SHAP values, in accordance with an embodiment of the present disclosure. It should be understood that the proposed solution detects non-optimal usage of certain transaction features by the payment authorizing entity such as the issuer 112 and/or acquirer 114 while detecting fraudulent transactions. In general, SHAP (SHapley Additive explanations) is a game theoretic approach that can explain the output of any machine learning model. This approach connects optimal credit allocation with local explanations using the classic SHAP values from game theory and their related extensions.

In a non-limiting example, let X be the set of payment transactions corresponding to a plurality of historical payment transaction data that may be accessed from a database (such as transaction database 118). In such a scenario, every transaction t ⊂ T can be categorized as, non-fraudulent transactions that got approved (A), fraudulent transactions that got approved (FR), and remaining transactions that got declined (D) by the authorization model or authentication system of the authorizing entity such that X=[A, FR, D]. The set of payment transaction features 302 is defined by tx ⊂ F, where F is the set of payment transaction features 302 and provided as an input to two separate models (i.e., fraud model 304 and the approval model 308).

Model A g(t) is the fraud model 304 that inputs only the approved transactions t ⊂ {A, FR} and tries to predict whether a transaction from the plurality of historical payment transactions is fraudulent or non-fraudulent.

Model B f (t) is the approval model 308 that inputs the non-fraudulent transactions that got approved and the declined transactions t ⊂ {A, D} and tries to predict whether a transaction from the plurality of historical payment transactions is approved or declined.

In various non-limiting examples, if g(t) and f (t) are considered to be linear regression models then, the output of both the fraud model 304 and the approval model 308, for the set of payment transaction features 302, tx ⊂ F then the $i^{th}$ prediction will be defined as:

$$\hat{y}_{FM} = g(t_i) = b_0 + \sum_{j=1}^{M} b_j tx_j \quad \text{Eqn. (1)}$$

where, $\{tx_j\}$ is the corresponding predictors or features and $\{b0, \ldots bj\}$ are the estimated regression coefficients. If predictions are independent, the contribution of the jth predictor to the predicted response $\hat{y}_{tx_j}$ can be unambiguously expressed as $b_j tx_{ji}$ features.

Now since the set of payment transaction features 302 tx ⊂ F is not independent of each other, the model uses SHAP value-based methods for the interpretation of predictions of the models. It should be understood that SHAP value-based methods are a generalization of the abovementioned concept toward more complex supervised algorithms and SHAP can be used to calculate the contribution of any transaction feature towards the prediction irrespective of the complexity of the underlying model. In one embodiment, there may be $2^k$ possible coalitions of transaction feature values and the "absence" of a transaction feature has to be simulated by drawing random instances, an exact computation of the SHAP values is computationally expensive. Further, the SHAP values take a long time to compute which raises the variance for the SHAP value estimation. Therefore, it should be understood that the number of iterations should be large enough to estimate the SHAP values, but small enough to complete the computation in a reasonable time. Further, the exponential number of coalitions should be dealt with by sampling coalitions. Furthermore, decreasing the value of 'M' reduces the computation time, but increases the variance of the value. It should be noted that the fraud model 304 may operate using a first set of SHAP values 306 and the approval model 308 may operate using a second set of SHAP values 310. Although, in some scenarios, the first set of SHAP values 306 may be the same as the second set of SHAP values 310.

Thus, for a given 'F', the set of payment transaction features and 'S' denoting a subset of the transaction features; S U $tx_j$ is the union of the subset S and transaction feature $tx_j$. $E[f(X)|X_s=x_s]$ is the conditional expectation of model f(·) when a subset S of transaction features is fixed at the local point x, the contribution of $tx_j$ towards the prediction using model f(·) is defined by $$\phi_{ftx_j} = \sum_{S \subseteq F \setminus \{tx_j\}} \frac{|S|!(|F|-|S|-1)!}{|F|!} E[f(X)|X_{S \cup tx_j} = x_{S \cup tx_j}] - \quad \text{Eqn. (2)}$$
$$E[F(X)|X_s = x_s]$$

Similarly, the contribution of $tx_j$ towards the prediction using model g(·) is defined by $$\phi_{gtx_j} = \sum_{S \subseteq F \setminus \{tx_j\}} \frac{|S|!(|F|-|S|-1)!}{|F|!} E[g(X)|X_{S \cup tx_j} = x_{S \cup tx_j}] - \quad \text{Eqn. (3)}$$
$$E[g(X)|X_s = x_s]$$

Further, the SHAP values on data samples can be calculated depending on the selection of the sample data set and different interpretations can be learned or brought out from it. The fraud model 304 derives the first set of SHAP values 306 and the approval model 308 derives the second set of SHAP values 310 for enhancing the interpretability of the transactions. Further, by comparing the SHAP values from various models using different samples-better interpretability is achieved. The difference between the forecast and the average prediction is dispersed evenly across the instance's feature values. Furthermore, one might compare a prediction to a subset or even a single data point instead of comparing it to the average forecast of the complete data set.

Further, $\phi gtx_j$ and $\phi\{ftx_j\}$ are calculated for every transaction feature such that tx ⊂ F at a transaction level and the transaction w ⊂ X is selected such that f(w) predicts that the transaction will get declined and g(w) predicts that the transaction will get approved. Thereafter, for every transaction, the features are rank-ordered in either ascending or decreasing order on their respective contribution or significance towards their respective predictions. Then, the difference in their ranks for the two models over all the plurality of historical payment transactions is compared to detect the transaction features which are either utilized or unutilized by the authorizing entity (i.e., the issuer 112 and/or acquirer 114) while developing their authentication model(s) or system(s).

A non-limiting example of the algorithm for determining the unutilized transaction features is provided below:

Require R features or raw historical payment data available, $F_C$ feature with category, $Y_D$ label for each decision by the model, $Y_F$ label for fraud transaction, STEP Number of feature to evaluate;
g(t) ← F (R, $Y_F$) ### Model R to predict Fraud$Y_F$;
$F_M$[i] ← SHAP(g(t)) ### Get top important feature;
for every iteration i ← 1 to STEP do
   $R_N$ ← Remove $F_M$[i] from R;
   $g(t)^i$ ← F ($R_N$, $Y_D$) ### Model R to predict $Y_D$;
   $Y^i{}_D$ ← $g(t)^i$ (RN) ### Inference via new model;
   f(t) ← F(R, $Y^i{}_D$) ### Model R to predict Approval-Decline $Y_D$;
   $AM^i{}_F$ ← $Y^i{}_F$ F(R) ### Adversarial model;
   Sorted_Missing_Feature ← GET_MISSING_FEATURE_SHAP(g(t), f(t),R)
     ### Predicted top 3 missing feature by model;
   if i in Sorted_Missing_Feature[:3]: correct+=1 endIF;
end
function GET_MISSING_FEATURE_SHAP(G,F,R);
for every txn t ← 1 to T do;

```
If F(t)=="Approve" and G(t) =="Decline" and Y_F =="fraud";
    F_N (t) ← SHAP(F(t));
    F_G (t) ← SHAP(G(t));
    Rankchange(F_N(t),F_G(t));
  endIF;
end for;
for every Feature ← 1 to F do;
    R_F ← Map(f,COUNT(f));
end for;
return R_F;
```

In an example embodiment, the above algorithm is evaluated on internal global Card-Not-Present customer transactions data (i.e., included within the plurality of historical payment transaction data) over a recent time period such as over a 6-month period. The set of payment transaction features may consist of 43 transaction features and may be broadly classified into a plurality of categories including, but not limited to, issuer and merchant features, transaction features, card features, security protocol, interaction features, and authentication status.

In one embodiment, the vulnerabilities and gaps in a black box system are identified by the approach of the present disclosure by identifying transaction features that are not fully utilized by the authorizing entity while building their authorization model or system. The black-box system is analogous to the transaction authentication system of financial institutions or banks. In order to present this investigation regarding the fallacies of the pre-existing model of the authorization entity in a structured fashion, three primary methods are discussed further including an empirical experiment for simulating a plurality of proxy authorization models, improving fraudulent transaction detection, and improving approval rate of the issuer 112 or acquirer 114 by reducing false decline rate.

The empirical experiment is set up to determine and validate the effectiveness of the plurality of proxy authorization models. The empirical experiment detects the gaps in the simulated authorizing model. In an embodiment, the simulated authorizing model may be an AI or ML model that is generated based at least in part on the set of utilized transaction features. In an example, the simulated authorizing model is trained on proxy decisions. The Proxy Decisions are generated by training an approval model after removing or altering random transaction features from the historical payment transaction data. The simulated authorizing model is now considered the black box system that is tried to break. It should be understood that the approval model can figure out the transaction feature(s) that have been removed or altered while building the simulated authorizing model. Thus, it can be rightly said that if the features that had been removed or altered while developing the synthetic approval model for the banks can be correctly identified, then the simulated authorizing model can effectively demonstrate similar transaction approval or decline behavior as the pre-existing model of the authorizing entity.

The present disclosure improves fraudulent transaction detection by utilizing real issuer data to identify the one or more unutilized transaction features that can be recommended to the respective authorizing entity to better the identification of fraudulent transactions. These recommended transaction features thus obtained are then shared with the respective account managers or system administrators to get their evaluation of the recommended transaction features.

In one exemplary implementation, the algorithm uses five different real issuer or acquirer transaction histories to identify the unutilized transaction features that can be recommended to the respective issuers 112 or acquirer 114 to reduce their false decline rate. The five issuers may be selected from different regions of the global market and the unutilized transaction features thus obtained are then shared with the respective account managers to get their evaluation of the features. The fraud model 304 and the approval model 308 are built on training data and the model performance is tested on a blind validation data set to avoid overfitting the training sets. In a particular implementation, a random forest classifier is used to train both the approval model and fraud model. The hyperparameter for the two classifiers varies from one authorizing entity to another. Now once the classifiers are finalized, explainer objects which build a weighted linear regression by using the data, the predictions, and the model are created. Further, the explainer objects compute perturbation around the examples and then calculate how much these perturbations impact the model. Further, a TreeExplainer ( ) which is an optimized version of the explainer object for tree-based models is used and a stratified sample of a dataset based on transaction amount, count, and issuer and acquirer country for the explainer object to take an expectation over is fed into the TreeExplainer ( )

Thus, the proposed architecture can detect features that are removed or altered while developing the simulated authorizing model. Additionally, the proposed architecture can identify important features (that are currently unutilized) that can be recommended to the issuers 112 or acquirers 114 (financial institutions or banks) to improve their approval rate and to reduce fraud count.

Figure 4:
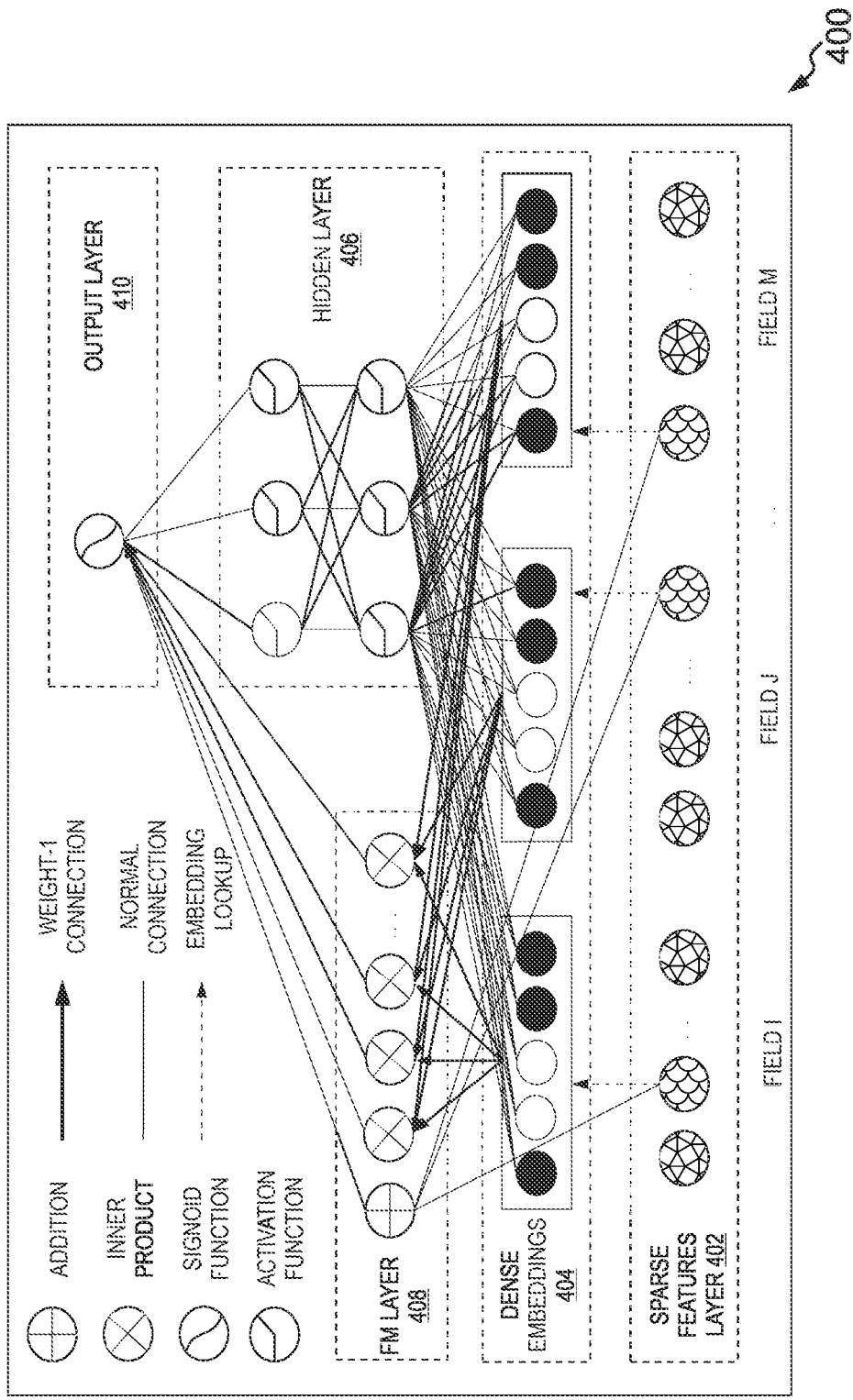
FIG. 4 illustrates a simplified block diagram representation of a neural network architecture of a DeepFM model, in accordance with an embodiment of the present disclosure.

FIG. 4 illustrates a simplified block diagram representation of a neural network architecture of a DeepFM model 400, in accordance with an embodiment of the present disclosure. As described earlier, DeepFM model 400 integrates the architectures of a deep neural network (DNN) model and a factorization machine (FM) model. In one embodiment, the objective of the DeepFM model 400 is to determine if the payment transaction between the cardholder 104 and the merchant 106 should be approved or declined. In some example embodiments, the DeepFM model 300 learns the approval logic of the issuer 112 or acquirer 114.

In one embodiment, the DeepFM model 400 may include sparse features layer 402, one or more dense embeddings layer 404, one or more hidden layers 406, an FM layer 408, and an output layer 410. In one embodiment, the data set for training of the DeepFM model 400 consists of n instances (x, y), where x is an m-fields data record usually involving a pair of cardholder 104 and item, and y ∈ {0, 1} is the associated label indicating cardholder transaction behaviors. Further, x may include one or more categorical features and one or more continuous features. In an example embodiment, the categorical features may include the gender of the cardholder 104, the location of the cardholder 104, etc., and the continuous fields may include the age of the cardholder 104, etc.

Each categorical feature of the one or more categorical features is represented as a vector of one-hot encoding and each continuous feature of the one or more continuous features is represented as the value itself, or a vector of one-hot encoding after discretization. Further, each instance of the n instances is converted to (x, y), where $x=[x_{field1}, x_{field2}, \ldots, x_{filedj}, \ldots, x_{fieldm}]$ is a d-dimensional vector, with xfieldj being the vector representation of the $j^{th}$ feature of x. Normally, x is high-dimensional and extremely sparse. The task of approval prediction is to build a prediction model ŷ=DeepFM_model(x) to estimate the probability of the particular transaction to be approved (which would have otherwise been previously declined) based on utilization of one or more authorizing components or a combination thereof.

The sparse features layer 402 of the DeepFM model 400 consists of multiple raw feature input vectors which are highly sparse where each input vector represents a transaction feature in a particular timeframe. The input vector can be of huge size as it may include manually designed pairwise feature interactions in the input vector of its wide part, which also greatly increases its complexity. Specifically, the raw feature input vector for approval prediction is usually highly sparse, super high-dimensional, categorical-continuous-mixed, and grouped in fields. The DeepFM model 400 shares the same input and also embedding vectors with both the deep learning model and the FM model. The categorical or the sparse features may include cardholder's bank's name, transaction type, merchant category, merchant region and country, credit/debit indicators, product code, product group name, and product indicator variables for CVC, AVS, ABU, 3DS, MDES, COF, and DI, etc.

The dense embeddings layer 404 compresses the input vector into a low dimensional, dense real-value input vector before further feeding into the first hidden layer of the one or more hidden layers 406, otherwise, the network can be overwhelming to train. The dense features may include IPV score band, average ticket size, spend amount, etc. The lengths of different input field vectors can be different and their embeddings are of the same size (k). The latent feature vectors (V) in FM now serve as network weights which are learned and used to compress the input field vectors to the embedding vectors. The dense embeddings layer 404 output is denoted as $$a^{(0)}=[e_1,e_2,\ldots,e_m]\ldots \qquad \text{Eqn. (4)}$$

Wherein '$e_i$' represents the embedding of i-th field and 'm' represents the the number of fields.

The one or more hidden layers 406 is a deep neural network model that may learn both low order and high order feature interaction from the raw features. The one or more hidden layers 406 inputs $a^{(0)}$ from the dense embeddings layer 404 and the forward process and is represented as: $a^{(l+1)}=\sigma(W^{(l)}a^{(l)}+b^{(l)})$, wherein, l is the layer depth and $\sigma$ is an activation function, and $a^{(l)}$, $W^{(l)}$, $b^{(l)}$ are the output, model weight, and bias of the $l^{th}$ layer.

The FM layer 408 includes a Factorization Machine (FM) component that may learn the feature interactions for a recommendation. Besides a linear (order-1) interactions among features, the FM models pairwise (order-2) feature interactions as inner product of respective feature latent vectors. The FM layer 408 can capture order-2 feature interactions much more effectively, especially when the dataset is sparse. The FM layer 408 uses the output of the dense embeddings layer 404 and measures the parameter of the interaction of features i and j via the inner product of their latent vectors $V_i$ and $V_j$. The FM layer 408 has a flexible design where it can train latent vector $V_i$ ($V_j$) whenever i (or j) appears in a data record. Therefore, feature interactions, which never or rarely appear in the training data are better learnt by FM layer 408. The FM layer 408 outputs a summation of an addition unit and a number of inner product units:

$$y_{FM} = (w, x) + \sum_{j_1=1}^{d}\sum_{j_2=j_1+1}^{d}(V_i, V_j)x_{j_1}, x_{j_2} \qquad \text{Eqn. (5)}$$

Wherein $W \in R^d$ and $V_i \in R^k$, where k is the size of the embeddings.

The Addition unit (w, x) reflects the importance of order-1 features, and the Inner Product units represent the impact of order-2 feature interactions. In one embodiment, we may include the FM model as part of the overall learning architecture, in addition to the other DNN model to eliminate the need for pre-training by FM model and instead jointly train the overall network in an end-to-end manner.

The output layer 410 inputs a dense real-value feature vector that is generated and feeds it into the sigmoid function for generating transaction approval rate predictions. It is given by $$y_{DNN} = \sigma(W^{|H|+1} \cdot a^H + b^{|H|+1}) \qquad \text{Eqn. (6)}$$

Wherein, |H| is the number of hidden layers.
Therefore, the combined prediction model is given by:

$$\hat{y}=\text{sigmoid}(y_{FM}+Y_{DNN})\ldots \qquad \text{Eqn. (7)}$$

Wherein, ŷ is binary (either 0 or 1, approved or declined) which is the generated predicted output.

As shown in the FIG. 4, it should be noted that a neural connection as a line refers to a connection with weight to be learned, a weight-1 connection in a bold straight line arrow, is a connection with weight 1 by default, and an embedding lookup in a dotted line arrow refers to a latent vector to be learned. In one embodiment, addition refers to adding all input together, the inner product refers to the output of this unit is the product of two input vector, the sigmoid function is used as the output function in approval prediction, and the activation function such as rectified logic unit (ReLU) is used for non-linearly transforming the signal.

In one example embodiment, the DeepFM model 400 includes 4 hidden layers containing 256, 256, 128, 64 nodes respectively where we use the ReLU activation function to capture nonlinearity and a dropout rate of 30% for regularization in each of these layers. The output thus obtained is passed through an output layer and sigmoid activation function. Further, in some scenarios, the DeepFM model 400 has approximately 1 million trainable parameters and we train the model using the Adam Optimizer and take the loss as the binary cross entropy loss for 200 epochs. In another embodiment, the SHAP values of the features may be used to enhance the approval logic of the issuer 112 based on the learnings of the DeepFM model 400 as well.

Figure 5A:
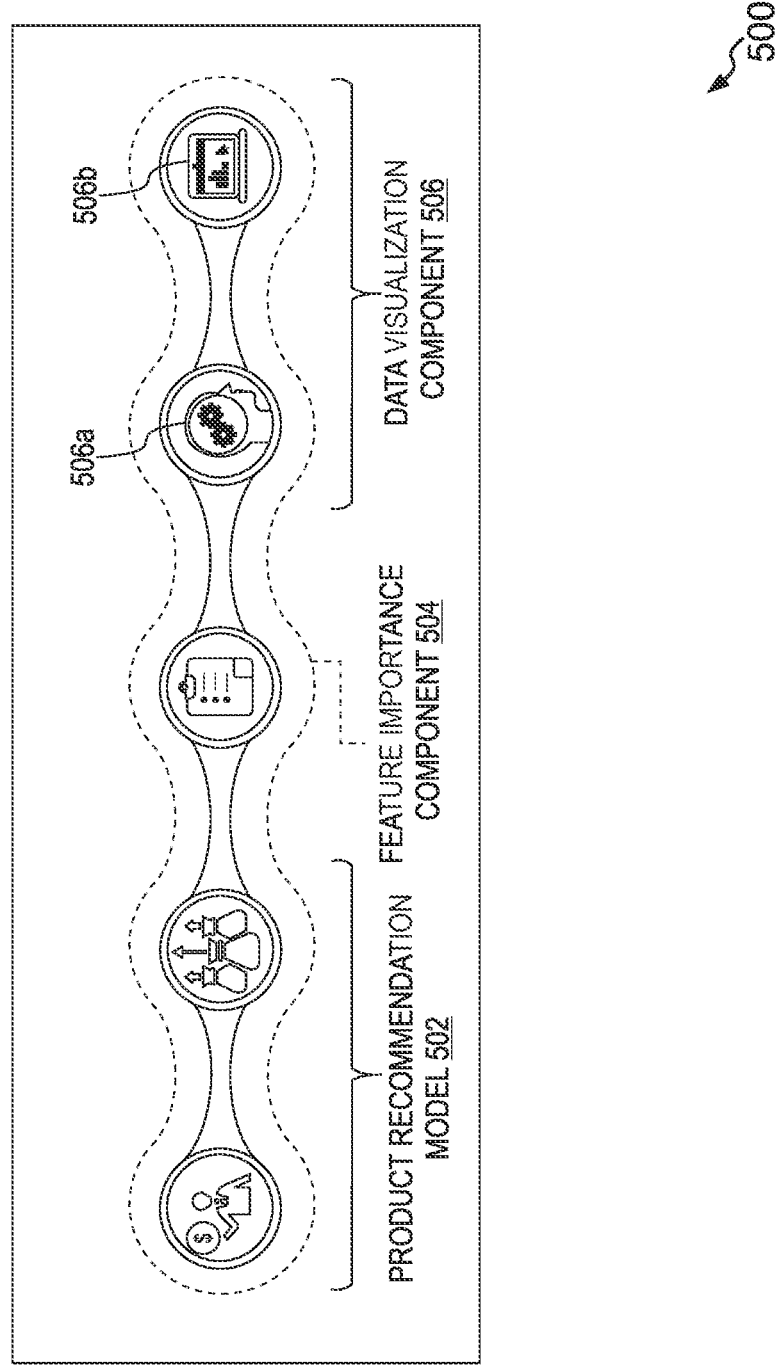
FIG. 5A illustrates a schematic representation 500 of various models for increasing approval rates of the transactions, in accordance with an embodiment of the present disclosure.

FIG. 5A illustrates a schematic representation 500 of various models for increasing approval rates of the transactions, in accordance with an embodiment of the present disclosure. It should be noted that FIG. 5A provides insights on the authorizing components or products being recommended to the authorizing entity to increase the transaction approval rates by running simulations and validating the use of each of the recommended authorizing components. The various models include a product recommendation model 502, a feature importance component 504, and a data visualization component 506 to provide insights on the authorizing component or products being recommended.

The product recommendation model 502 provides insights on the transaction approval rates and fraud transaction rates and recommends products that may increase the transaction approval rates while reducing fraud transaction rates when used in the transaction approval process. In one embodiment, the product recommendation model 502 estimates the increase in approval rates, fraud transaction rate by the issuer 112, acquirer 114 or the merchants 106 and also estimates the increase in revenue based on the approval of transactions. The product recommendation model 502 is explained further in detail in FIG. 5B.

The feature importance component 504 provides a value added service for the authorizing entity to help them improve their approval logic that is being presently used. In one embodiment, the one or more recommended transaction features from the set of unutilized transaction features are determined by the feature importance component 504. Further, the feature importance component 504 ensures that, when the authorizing entity utilizes the particular recommended transaction features for approving a transaction between a cardholder and a merchant, the approval logic of the authorizing entity is improved in order to reduce approval of the fraudulent transaction and also increase the transaction approval rates.

The data visualization component 506 may include a monthly bulletin 506a and a dashboard 506b for providing insights on the use of the recommended products and transaction features by the authorizing entity. The monthly bulletin 506a provides a detailed analysis of the recommended products shared with the authorizing entity (i.e., the issuers or the acquirers), and dashboard 506b provides insights into the recommendation and use of recommended features and products by the authorizing entity to the internal product teams for decision making. In an example embodiment, the dashboard 506b is used by the account managers during a conversation with the authorizing entity to help them decide which products to sign up for or which features they might want to explore to improve their in-house approval model (i.e., the pre-existing model).

Figure 5B:
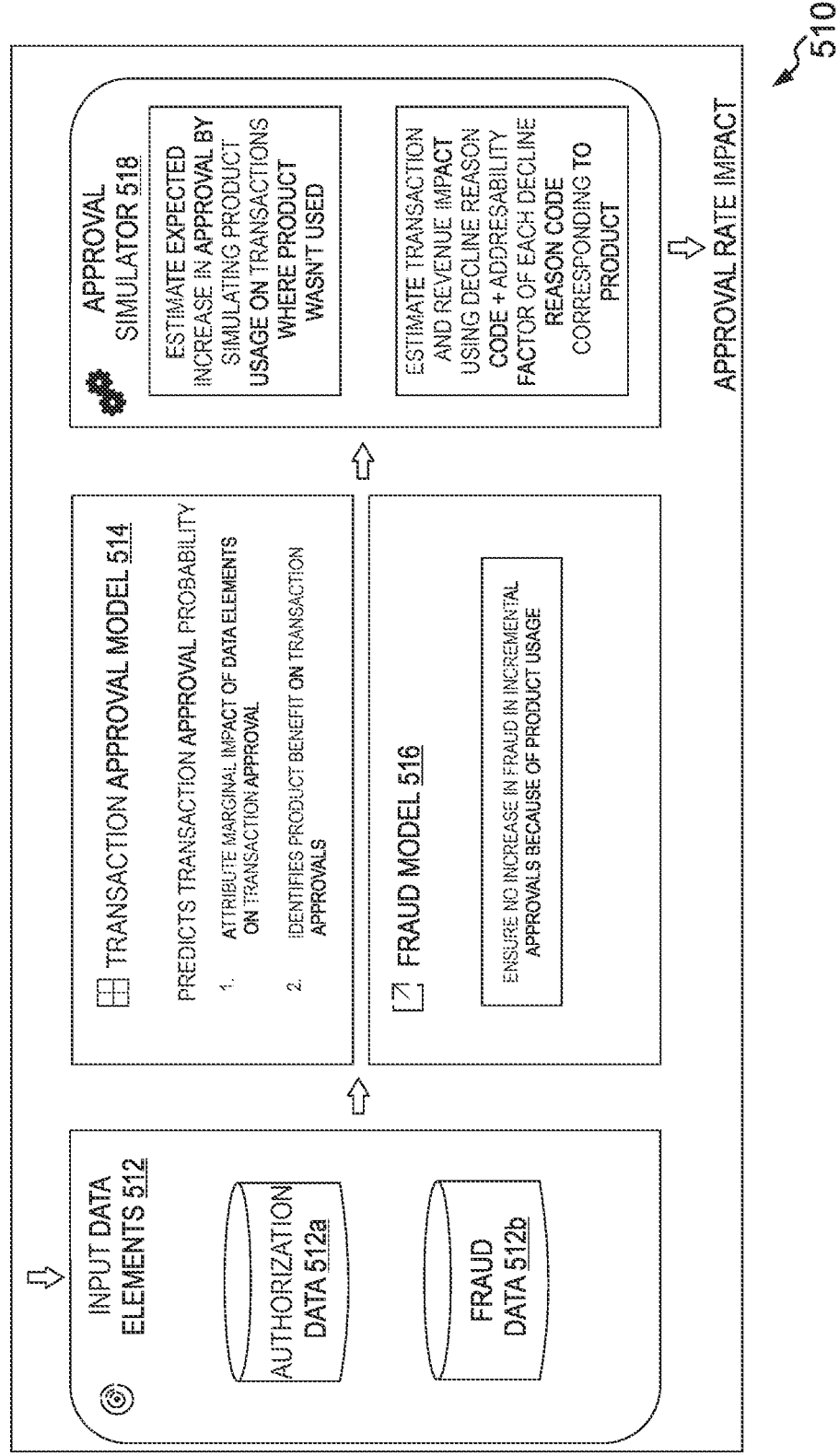
FIG. 5B illustrates a schematic representation of product recommendation model, in accordance with an embodiment of the present disclosure.

FIG. 5B illustrates a schematic representation of product recommendation model 510, in accordance with an embodiment of the present disclosure. The product recommendation model 510 provides recommendations on the products to be used by authorizing entity to increase the transaction approval rates by running simulations of using each product. The product recommendation model 510 is the same as the product recommendation model 502 of FIG. 5A.

The product recommendation model 510 may include input data elements 512, a transaction approval model 514, a fraud model 516, and an approval simulator 518. The product recommendation model 510 recommends products that need to be used by the authorizing entity during the approval of transactions for increasing the rate of approval and reduce the rate of fraud.

The input data elements 512 include authorization data 512a and fraud data 512b. The authorization data 512a is the collection of historical authorization data. In an example, the historical authorization data may be extracted from the plurality of historical payment transaction data. In one embodiment, the historical authorization data consists of transaction data of the transactions between the cardholder 104 and the merchant 106 that were previously authorized by the issuer 112. The fraud data 512b is a collection of historical fraudulent transaction data. In one embodiment, the historical fraudulent transaction data consists of transaction data of the transactions between the cardholder 104 and the merchant 106 that were previously declined and marked as fraudulent transactions.

The transaction approval model 514 is the same as the approval model 308. The transaction approval model 514 is trained to predict the approval probability of a particular transaction. The transaction approval model 514 attributes the marginal impact of various payment transaction attributes on transaction approvals and identifies the benefits that one or more authorizing components or a combination thereof might bring to the overall transaction approval rate for the particular payment transaction.

The fraud model 516 checks fraud bias in a payment transaction to ensure there is no increase in the fraud rates in the approval of the upcoming transactions because of the product usage. The fraud model 516 utilizes historical fraud data to ensure that there is no fraudulent transaction being approved.

The approval simulator 518 generates simulations of the approval of transaction between the cardholder 104 and the merchant 106 by the authorizing entity. The simulations are run to estimate the expected increase in the approval rates by simulating the product usage on the transactions where the product wasn't previously used. The approval simulator 518 also generates simulations to estimate transaction and revenue impact while using the decline reason code and the addressability factor of each decline reason code corresponding to the usage of the product. In one embodiment, the approval simulator 518 simulates the declined transactions by applying products to the transaction which hadn't used any product previously to determine if there's any increase in the approval rate or if the transaction gets approved upon using the product. In another embodiment, the approval simulator 518 runs simulations on the approved transactions to determine if any of the fraudulent transactions were approved. Further, based on the simulation run by the approval simulator 518, the product recommendation model 510 provides suitable insights on the approval rate impact on the transaction.

FIGS. 6A-6D, collectively, illustrate a comparative analysis of simulation of the use of authorization products on the transaction data to recommend the best suitable products to increase the approval rates, in accordance with an embodiment of the present disclosure.

FIG. 6A illustrates a table 600 including a list of payment transactions for a particular financial institution. The table discloses multiple transaction variables Var1, Var2, Var3, and multiple products Product 1, Product 2, Product 3, and Product 4 that are being tested on the transaction variables Var1, Var2, Var3. A simulation test is performed using the simulated authentication model to validate or test whether certain products can be recommended for the payment transaction to increase its approval rates based at least in part on determining an increase in the transaction approval rate in comparison with the transaction approval rate and the fraud transaction rate of the simulated authentication model.

FIG. 6B illustrates a table 610 including results after applying the approval model on the transaction variables as shown in the table 600 to get probability scores of the transactions getting declined or approved. A payment transaction is considered to have a higher probability of getting declined when the scores are towards 1.

Figure 6D:

FIG. 6C illustrates a table 620 where the simulator is simulating to validate if Product 2 can be recommended to be applied to the transaction, the table is altered accordingly to add Product 2 to the transaction data and then the simulated authentication model is used to get the probability score of the transactions of getting declined or approved. FIG. 6D represents a result table 630 of the table 620, if the percentage (%) change in score in higher than 10% and the approval score during simulation is lower than 0.5, then those transactions as approved are considered as per the simulation. The expected approval rate in the declined transactions for this example is 67%.

Figure 7A:
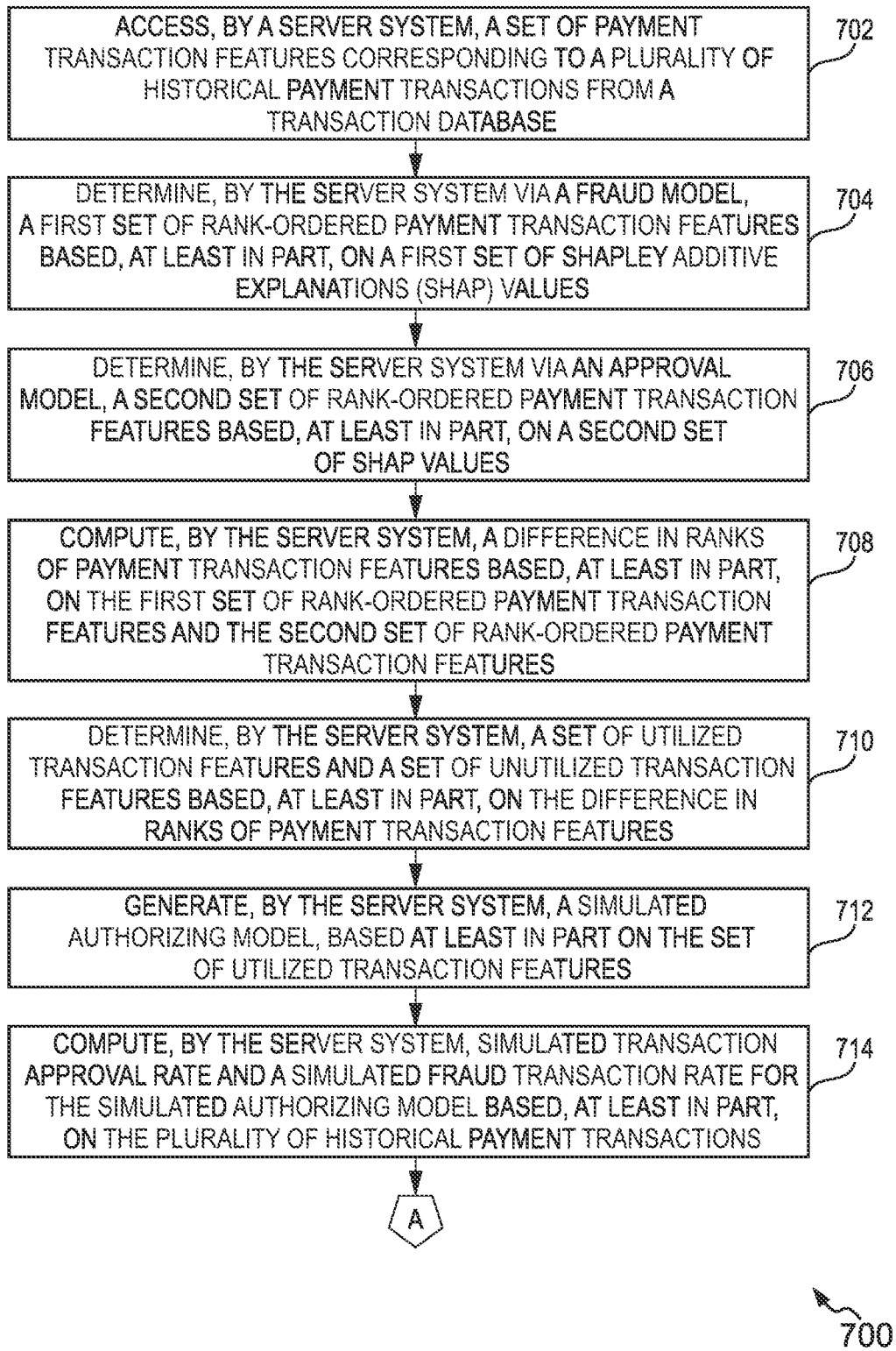
FIG. 7A and FIG. 7B, collectively represent, a flow chart of a computer-implemented method 700 for increasing the transaction approval rate of a payment transaction, in accordance with an embodiment of the present disclosure.
Figure 7B:
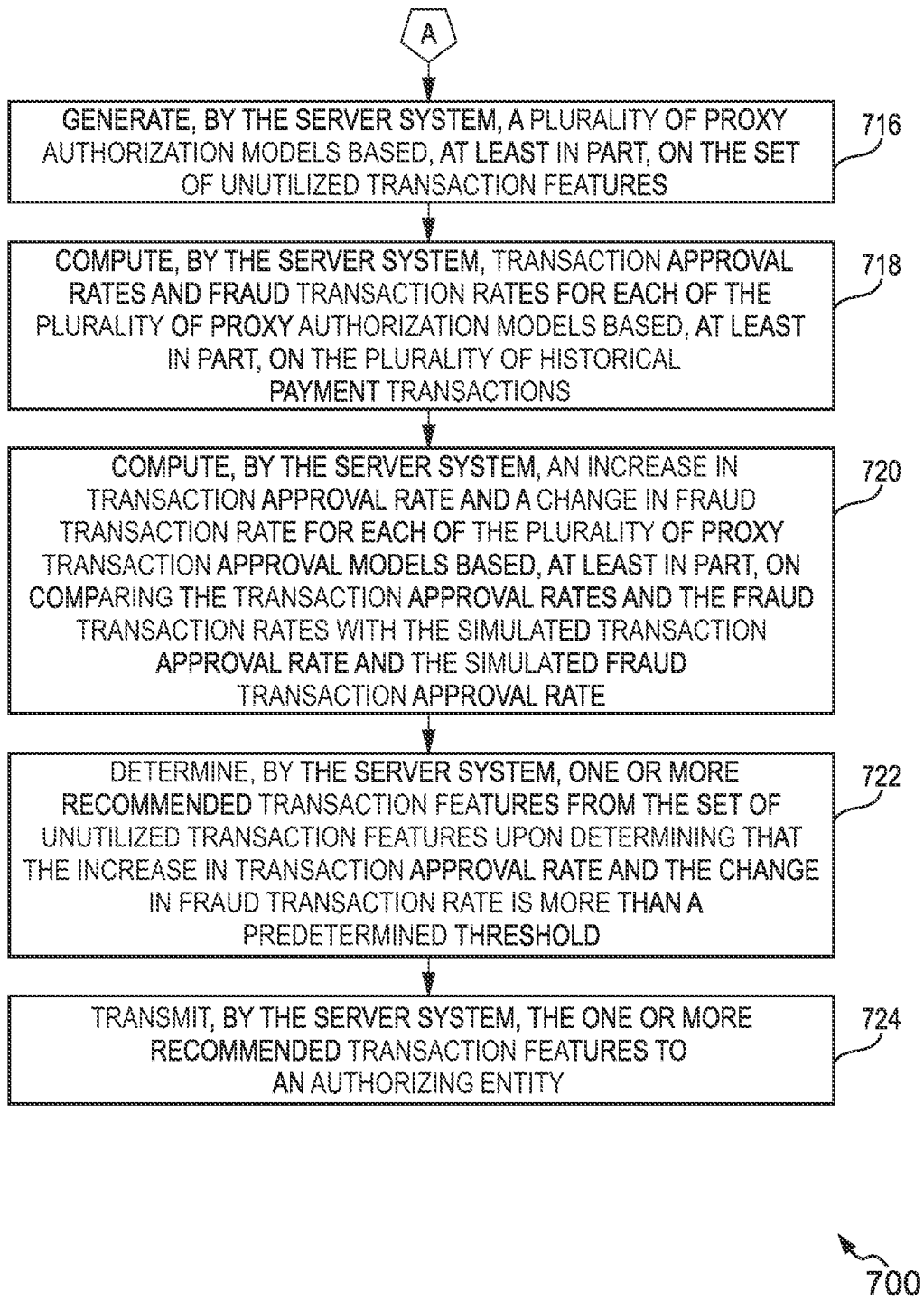

FIG. 7A and FIG. 7B, collectively represent, a flow chart of a computer-implemented method 700 for increasing the transaction approval rate of a payment transaction, in accordance with an embodiment of the present disclosure. The method 700 depicted in the flow chart may be executed by, for example, a computer system. The computer system is identical to the server system 200. Operations of the flow chart of the method 700, and combinations of operations in the flow chart of the method 700, may be implemented by, for example, hardware, firmware, a processor, circuitry, and/or a different device associated with the execution of software that includes one or more computer program instructions. It is noted that the operations of the method 700 can be described and/or practiced by using a system other than these computer systems. The method 700 starts at operation 702.

At operation 702, the method 700 includes accessing, by a server system, a set of payment transaction features corresponding to a plurality of historical payment transactions from a transaction database.

At operation 704, the method 700 includes determining, by the server system via a fraud model 304, a first set of rank-ordered payment transaction features based, at least in part, on a first set of shapley additive explanations (SHAP) values 306. In an example, each of the first set of rank-ordered payment transaction features may indicate towards the contribution of the corresponding payment transaction feature in predicting whether the payment transaction from the plurality of historical payment transactions is fraudulent or non-fraudulent.

At operation 706, the method 700 includes determining, by the server system via an approval model 308, a second set of rank-ordered payment transaction features based, at least in part, on a second set of SHAP values 310. In an example, each of the second set of rank-ordered payment transaction features may indicate towards the contribution of the corresponding payment transaction feature in predicting whether the payment transaction from the plurality of historical payment transactions is approved or declined. In some scenarios, the second set of SHAP values 310 may be the same as the first set of SHAP values 306.

At operation 708, the method 700 includes computing, by the server system, a difference in ranks of payment transaction features based, at least in part, on the first set of rank-ordered payment transaction features and the second set of rank-ordered payment transaction features.

At operation 710, the method 700 includes determining, by the server system, a set of utilized transaction features and a set of unutilized transaction features based, at least in part, on the difference in ranks of payment transaction features.

At operation 712, the method 700 includes generating, by the server system, a simulated authorizing model, based at least in part, on the set of utilized transaction features.

At operation 714, the method 700 includes computing, by the server system, simulated transaction approval rate and a simulated fraud transaction rate for the simulated authorizing model based, at least in part, on the plurality of historical payment transactions.

At operation 716, the method 700 includes generating, by the server system, a plurality of proxy authorization models based, at least in part, on the set of unutilized transaction features.

At operation 718, the method 700 includes computing, by the server system, transaction approval rates and fraud transaction rates for each of the plurality of proxy authorization models based, at least in part, on the plurality of historical payment transactions.

At operation 720, the method 700 includes computing, by the server system, an increase in transaction approval rate and a change in fraud transaction rate for each of the plurality of proxy transaction approval models based, at least in part, on comparing the transaction approval rates and the fraud transaction rates with the simulated transaction approval rate and the simulated fraud transaction approval rate.

At operation 722, the method 700 includes determining, by the server system, one or more recommended transaction features from the set of unutilized transaction features upon determining that the increase in transaction approval rate and the change in fraud transaction rate is more than a predetermined threshold.

At operation 724, the method 700 includes transmitting, by the server system, the one or more recommended transaction features to an authorizing entity.

The sequence of operations of the method 700 need not be necessarily executed in the same order as they are presented. Further, one or more operations may be grouped together and performed in form of a single step, or one operation may have several sub-steps that may be performed in parallel or in a sequential manner.

Figure 8:
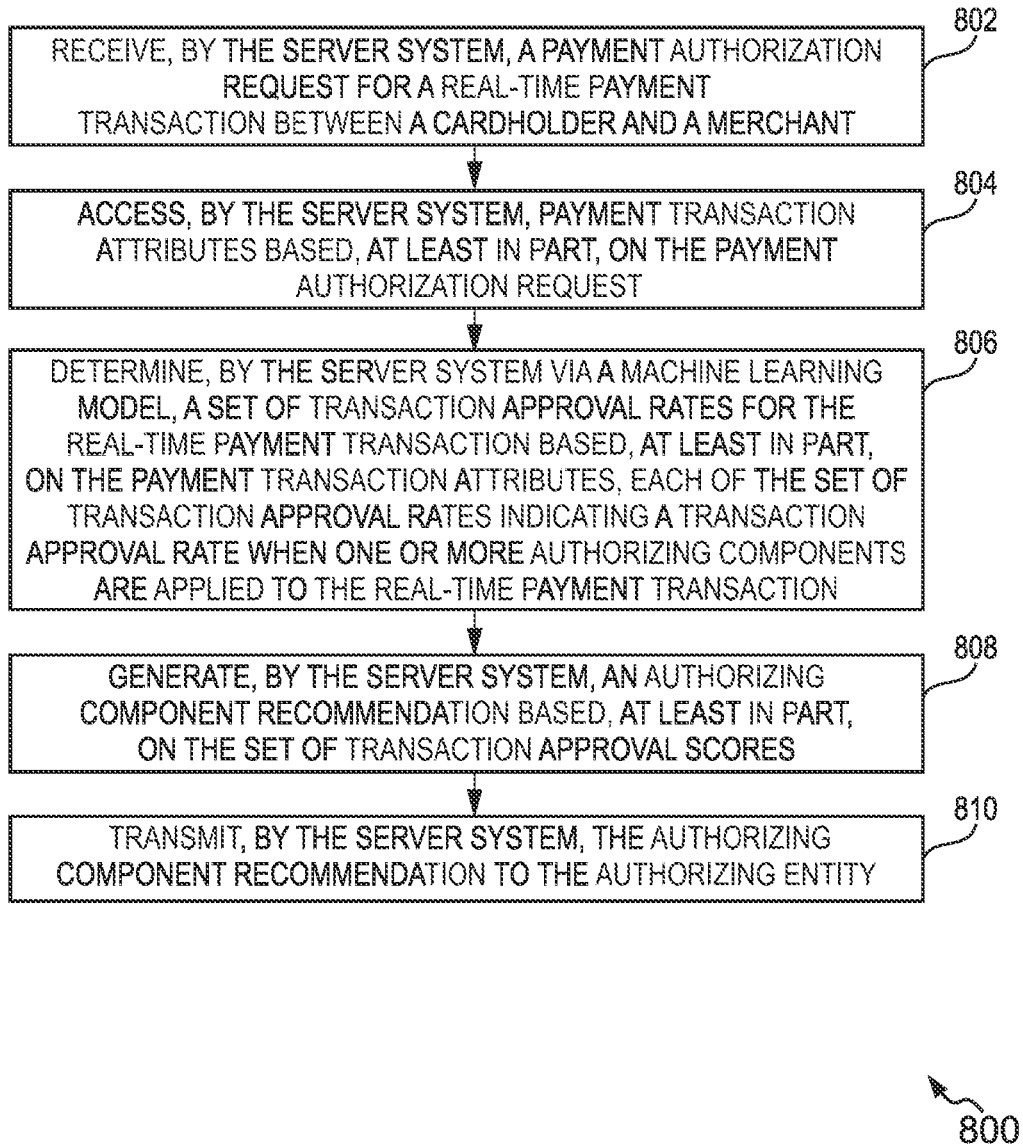
FIG. 8 is a flow chart of a computer-implemented method for increasing the transaction approval rate of a payment transaction by recommending one or more authorizing components, in accordance with an embodiment of the present disclosure.

FIG. 8 is a flow chart of a computer-implemented method 800 for increasing the transaction approval rate of a payment transaction by recommending one or more authorizing components, in accordance with an embodiment of the present disclosure. The method 800 depicted in the flow chart may be executed by, for example, a computer system. The computer system is identical to the server system 200. Operations of the flow chart of the method 800, and combinations of operations in the flow chart of the method 800, may be implemented by, for example, hardware, firmware, a processor, circuitry, and/or a different device associated with the execution of software that includes one or more computer program instructions. It is noted that the operations of the method 800 can be described and/or practiced by using a system other than these computer systems. The method 800 starts at operation 802.

At operation 802, the method 800 includes receiving, by the server system, a payment authorization request for a real-time payment transaction between a cardholder and a merchant.

At operation 804, the method 800 includes accessing, by the server system, payment transaction attributes based, at least in part, on the payment authorization request.

At operation 806, the method 800 includes determining, by the server system via a machine learning model, a set of transaction approval rates for the real-time payment transaction based, at least in part, on the payment transaction attributes, each of the set of transaction approval rates indicating a transaction approval rate when one or more authorizing components are applied to the real-time payment transaction.

At operation 808, the method 800 includes generating, by the server system, an authorizing component recommendation based, at least in part, on the set of transaction approval scores.

At operation 810, the method 800 includes transmitting, by the server system, the authorizing component recommendation to the authorizing entity.

The sequence of operations of the method 800 need not be necessarily executed in the same order as they are presented. Further, one or more operations may be grouped together and performed in form of a single step, or one operation may have several sub-steps that may be performed in parallel or in a sequential manner.

Figure 9:
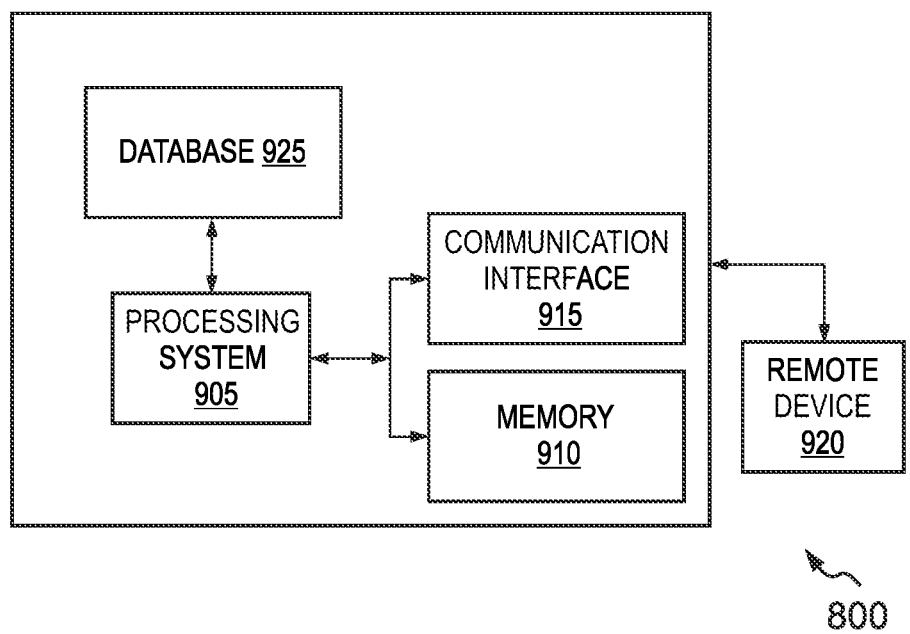
FIG. 9 is a simplified block diagram of a payment server, in accordance with an embodiment of the present disclosure.

FIG. 9 is a simplified block diagram of a payment server 900, in accordance with an embodiment of the present disclosure. The payment server 900 is an example of the payment server 110 of FIG. 1. The payment server 900 and the server system 200 may use the payment network 108 as a payment interchange network. Examples of payment interchange networks include, but are not limited to, Mastercard® payment system interchange network.

The payment server 900 includes a processing system 905 configured to extract programming instructions from a memory 910 to provide various features of the present disclosure. The components of the payment server 900 provided herein may not be exhaustive and the payment server 900 may include more or fewer components than those depicted in FIG. 9. Further, two or more components may be embodied in one single component, and/or one component may be configured using multiple sub-components to achieve the desired functionalities. Some components of the payment server 900 may be configured using hardware elements, software elements, firmware elements, and/or a combination thereof.

Via a communication interface 915, the processing system 905 receives a request from a remote device 920, such as the issuer server 112 or the acquirer server 114. The request may be a request for conducting the payment transaction. The communication may be achieved through API calls, without loss of generality. The payment server 900 includes a database 925. The database 925 also includes transaction processing data such as issuer ID, country code, acquirer ID, merchant identifier (MID), among others.

When the payment server 900 receives a payment transaction request from the acquirer server 114 or a payment terminal (e.g., point of sale (POS) device, etc.), the payment server 900 may route the payment transaction request to an issuer server (e.g., the issuer server 112). The database 925 stores transaction identifiers for identifying transaction details (such as transaction amount, payment card details, acquirer account information, transaction records, merchant account information, and the like).

In one example embodiment, the acquirer server 114 is configured to send an authorization request message to the payment server 900. The authorization request message includes, but is not limited to, the payment transaction request.

The processing system 905 further sends the payment transaction request to the issuer server 112 for facilitating the payment transactions from the remote device 920. The processing system 905 is further configured to notify the remote device 920 of the transaction status in form of an authorization response message via the communication interface 915. The authorization response message includes, but is not limited to, a payment transaction response received from the issuer server 112. Alternatively, in one embodiment, the processing system 905 is configured to send an authorization response message for declining the payment transaction request, via the communication interface 915, to the acquirer server 114.

In one embodiment, the database 925 is also configured to store historical clearing and chargeback activities associated with the plurality of cardholders. In an example, the database 925 may store information about transactions performed by the cardholder (e.g., the cardholder 104) at a plurality of merchants (e.g., the merchant 106).

Figure 10:
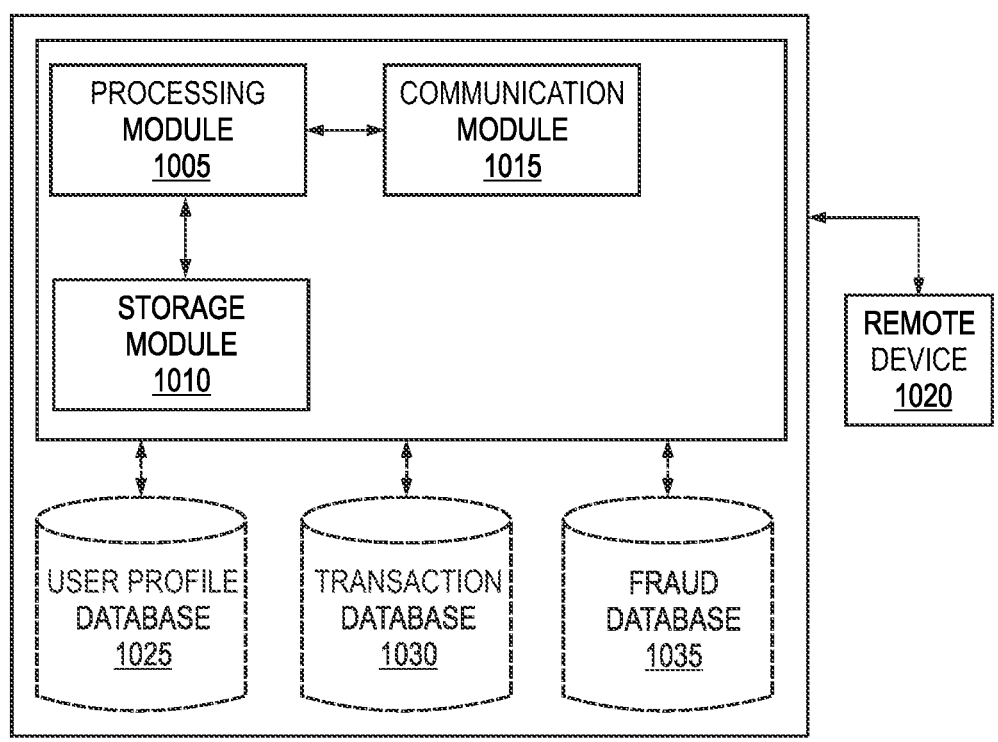
FIG. 10 is a simplified block diagram of an issuer server, in accordance with an embodiment of the present disclosure.

FIG. 10 is a simplified block diagram of an issuer server 1000, in accordance with an embodiment of the present disclosure. The issuer server 1000 is an example of the issuer server 112 of FIG. 1. The issuer server 1000 is associated with an issuer bank/issuer, in which a cardholder (e.g., the cardholder 104) may have an account, which provides a payment card. The issuer server 1000 includes a processing module 1005 operatively coupled to a storage module 1010 and a communication module 1015. The components of the issuer server 1000 provided herein may not be exhaustive and the issuer server 1000 may include more or fewer components than those depicted in FIG. 10. Further, two or more components may be embodied in one single component, and/or one component may be configured using multiple sub-components to achieve the desired functionalities. Some components of the issuer server 1000 may be configured using hardware elements, software elements, firmware elements and/or a combination thereof.

The storage module 1010 is configured to store machine-executable instructions to be accessed by the processing module 1005. Additionally, the storage module 1010 stores information related to, contact information of the cardholder 104, bank account number, availability of funds in the account, payment card details, transaction details, payment account details, and/or the like. Further, the storage module 1010 is configured to store payment transactions.

In one embodiment, the issuer server 1000 is configured to store profile data (e.g., an account balance, a credit line, details of the cardholder (i.e., the cardholder 104), account identification information, payment card number, etc.) in the transaction database 118. The details of the cardholder 104 may include, but not limited to, name, age, gender, physical attributes, location, registered contact number, family information, alternate contact number, registered e-mail address, or the like of the cardholder 104, etc.

The processing module 1005 is configured to communicate with one or more remote devices such as a remote device 1020 using the communication module 1015 over a network such as the network 120 of FIG. 1. The examples of the remote device 1020 include the server system 200, the payment server 110, the transaction database 118 or other computing systems of the issuer server 1000 and the network 120 and the like. The communication module 1015 is capable of facilitating such operative communication with the remote devices and cloud servers using API (Application Program Interface) calls. The communication module 1015 is configured to receive a payment transaction request performed by the cardholder (i.e., the cardholder 104) via the network 120. The processing module 1005 receives a payment card information, a payment transaction amount, customer information, and merchant information from the remote device 1020 (e.g., the payment server 110). The issuer server 1000 includes a transaction database 1030 for storing transaction data. In an example, the transaction database 1030 is similar to the transaction database 118.

The payment transaction data may include, but not limited to, transaction attributes, such as transaction amount, source of funds such as bank or credit cards, transaction channel used for loading funds such as POS terminal or ATM machine, transaction velocity features such as count and transaction amount sent in the past x days to a particular cardholder, transaction location information, external data sources, and other internal data to evaluate each transaction. The issuer server 1000 includes a user profile database 1025 storing user profile associated with the plurality of cardholders. In one embodiment, the issuer server 1000 is also configured to store historical fraudulent chargeback activities associated with the plurality of cardholders in a fraud database 1035. The user profile data may include an account balance, a credit line, and details of the cardholder (i.e., the cardholder 104), account identification information, payment card number, or the like. The details of the cardholder (i.e., the cardholder 104) may include, but are not limited to, name, age, gender, physical attributes, location, registered contact number, family information, alternate contact number, registered e-mail address, or the like of the cardholder (i.e., the cardholder holder 104).

The one or more operations of the server system 200 that are disclosed with reference to FIGS. 1 to 10 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 200 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method comprising:
   accessing, by a server system, a set of payment transaction features corresponding to a plurality of historical payment transactions from a transaction database;
   determining, by the server system via a fraud model, a first set of rank-ordered payment transaction features based, at least in part, on a first set of shapley additive explanations (SHAP) values, each of the first set of rank-ordered payment transaction features indicating a contribution of a corresponding payment transaction feature in predicting whether a payment transaction from the plurality of historical payment transactions is fraudulent or non-fraudulent;
   determining, by the server system via an approval model, a second set of rank-ordered payment transaction features based, at least in part, on a second set of SHAP values, each of the second set of rank-ordered payment transaction features indicating the contribution of a corresponding payment transaction feature in predicting whether a payment transaction from the plurality of historical payment transactions is approved or declined;
   computing, by the server system, a difference in ranks of payment transaction features based, at least in part, on the first set of rank-ordered payment transaction features and the second set of rank-ordered payment transaction features;

determining, by the server system, a set of utilized transaction features and a set of unutilized transaction features based, at least in part, on the difference in the ranks of payment transaction features;

generating, by the server system, a simulated authorizing model, based at least in part on the set of utilized transaction features;

computing, by the server system, a simulated transaction approval rate and simulated fraud transaction rate for the simulated authorizing model based, at least in part, on the plurality of historical payment transactions;

generating, by the server system, a plurality of proxy authorization models based, at least in part, on the set of unutilized transaction features;

computing, by the server system, transaction approval rates and fraud transaction rates for each of the plurality of proxy authorization models based, at least in part, on the plurality of historical payment transactions;

computing, by the server system, an increase in transaction approval rate and a change in fraud transaction rate for each of a plurality of proxy transaction approval models based, at least in part, on comparing the transaction approval rates and the fraud transaction rates with the simulated transaction approval rate and a simulated fraud transaction approval rate;

determining, by the server system, one or more recommended transaction features from the set of unutilized transaction features upon determining that the increase in the transaction approval rate for the one or more recommended transaction features and the change in fraud transaction rate for the one or more recommended transaction features are more than a predetermined threshold;

transmitting, by the server system, the one or more recommended transaction features to an authorizing entity;

utilizing, by the authorizing entity, the one or more recommended transaction features to determine whether a transaction is fraudulent and disapproved, or is approved;

receiving, by the server system, a payment authorization request for a real-time payment transaction between a cardholder and a merchant;

accessing, by the server system, payment transaction attributes based, at least in part, on the payment authorization request;

determining, by the server system via a machine learning model, a set of transaction approval rates for the real-time payment transaction based, at least in part, on the payment transaction attributes, each of the set of transaction approval rates indicating a transaction approval rate when one or more authorizing components are applied to the real-time payment transaction, wherein the machine learning model is a Deep Factorization Machine (FM) model including
an FM layer that generates FM outputs by modelling low-order feature interactions based on the payment transaction attributes,
a deep neural network (DNN) that generates DNN outputs by modelling high-order and low-order feature interactions based on the payment transaction attributes, and
an output layer that combines the FM outputs and the DNN outputs to generate a final output;

generating, by the server system, an authorizing component recommendation based, at least in part, on a set of transaction approval rates; and transmitting, by the server system, the authorizing component recommendation to the authorizing entity.

2. The computer-implemented method of claim 1, wherein the set of payment transaction features comprises at least one of: issuer and merchant features, transaction features, card features, security protocol, interaction features, and authentication status.

3. The computer-implemented method of claim 1, further comprising: validating, by the server system, the simulated authorizing model, based at least in part on the plurality of historical payment transactions.

4. The computer-implemented method of claim 1, further comprising: adjusting, by the server system, the increase in the transaction approval rate and the change in fraud transaction rate for each of the plurality of proxy transaction approval models based on an addressability criterion, the addressability criterion indicating a set of industry specific security protocols.

5. The computer-implemented method of claim 1, wherein the fraud model and the approval model are linear regression models.

6. The computer-implemented method of claim 1, wherein the payment transaction attributes comprise at least one of: transaction amount, card on file indicator, recurring payment indicator, cross border indicator, product type, P2P indicator, merchant country, currency conversion, merchant category code (MCC), Security Level Indicator (SLI) value, OB5 and Account Authentication Value (AVV) results, Authorization IQ scores, and enabled authorizing components details.

7. The computer-implemented method of claim 1, further comprising:
validating, by the server system, the authorizing component recommendation based, at least in part, on determining an increase in the transaction approval rate after applying the one or more authorizing components on comparison with the simulated transaction approval rate and the simulated fraud transaction rate.

8. The computer-implemented method of claim 1, wherein generating the authorizing component recommendation, further comprises:
processing, by the server system, the real-time payment transaction based, at least in part, on the one or more authorizing components;
computing, by the server system, the transaction approval rate for each of the one or more authorizing components; and
selecting, by the server system, the one or more authorizing components with the highest transaction approval rate.

9. The computer-implemented method as claimed in claim 1, wherein the server system is payment server associated with a payment network.

10. A server system, comprising:
communication interfaces;
memories comprising executable instructions; and
processors communicably coupled to the communication interfaces and the memories memory, the processors configured to execute the instructions to cause the server system, at least in part, to:
access a set of payment transaction features corresponding to a plurality of historical payment transactions from a transaction database;

determine via a fraud model, a first set of rank-ordered payment transaction features based, at least in part, on a first set of shapley additive explanations (SHAP) values, each of the first set of rank-ordered payment transaction features indicating a contribution of a corresponding payment transaction feature in predicting whether a payment transaction from the plurality of historical payment transactions is fraudulent or non-fraudulent;

determine via an approval model, a second set of rank-ordered payment transaction features based, at least in part, on a second set of SHAP values, each of the second set of rank-ordered payment transaction features indicating the contribution of a corresponding payment transaction feature in predicting whether a payment transaction from the plurality of historical payment transactions is approved or declined;

compute a difference in ranks of payment transaction features based, at least in part, on the first set of rank-ordered payment transaction features and the second set of rank-ordered payment transaction features;

determine a set of utilized transaction features and a set of unutilized transaction features based, at least in part, on the difference in ranks of payment transaction features;

generate a simulated authorizing model, based at least in part on the set of utilized transaction features;

compute a simulated transaction approval rate and simulated fraud transaction rate for the simulated authorizing model based, at least in part, on the plurality of historical payment transactions;

generate a plurality of proxy authorization models based, at least in part, on the set of unutilized transaction features;

compute transaction approval rates and fraud transaction rates for each of the plurality of proxy authorization models based, at least in part, on the plurality of historical payment transactions;

compute an increase in transaction approval rate and a change in fraud transaction rate for each of a plurality of proxy transaction approval models based, at least in part, on comparing the transaction approval rates and the fraud transaction rates with the simulated transaction approval rate and the simulated fraud transaction rate;

determine one or more recommended transaction features from the set of unutilized transaction features upon determining that the increase in transaction approval rate for the one or more recommended transaction features and the change in fraud transaction rate are for the one or more recommended transaction features more than a predetermined threshold;

transmit the one or more recommended transaction features to an authorizing entity; and utilize, by the authorizing entity, the one or more recommended transaction features to determine whether a transaction is fraudulent and disapproved, or is approved;

receive a payment authorization request for a real-time payment transaction between a cardholder and a merchant;

access payment transaction attributes based, at least in part, on the payment authorization request;

determine, via a machine learning model, a set of transaction approval rates for the real-time payment transaction based, at least in part, on the payment transaction attributes, each of the set of transaction approval rates indicating a transaction approval rate when one or more authorizing components are applied to the real-time payment transaction, wherein the machine learning model is a Deep Factorization Machine (FM) model including
  an FM layer that generates FM outputs by modelling low-order feature interactions based on the payment transaction attributes,
  a deep neural network (DNN) that generates DNN outputs by modelling high-order and low-order feature interactions based on the payment transaction attributes,
  an output layer that combines the FM outputs and the DNN outputs to generate a final output;
generate an authorizing component recommendation based, at least in part, on a set of transaction approval rates; and
transmit the authorizing component recommendation to the authorizing entity.

11. The server system of claim 10, wherein the set of payment transaction features comprises at least one of: issuer and merchant features, transaction features, card features, security protocol, interaction features, and authentication status.

12. The server system of claim 10, wherein the server system is further caused, at least in part, to:
validate the simulated authorizing model, based at least in part on the plurality of historical payment transactions.

13. The server system of claim 10, wherein the server system is further caused, at least in part, to:
adjust the increase in transaction approval rate and the change in fraud transaction rate for each of the plurality of proxy transaction approval models based on an addressability criterion, the addressability criterion indicating a set of industry specific security protocols.

14. The server system of claim 10, wherein the payment transaction attributes comprise at least one of: transaction amount, card on file indicator, recurring payment indicator, cross border indicator, product type, P2P indicator, merchant country, currency conversion, merchant category code (MCC), Security Level Indicator (SLI) value, OB5 and Account Authentication Value (AVV) results, Authorization IQ scores, and enabled authorizing components details.

15. The server system of claim 10, wherein the server system is further caused, at least in part, to:
validate, by the server system, the authorizing component recommendation based, at least in part, on determining an increase in the transaction approval rate after applying the one or more authorizing components on comparison with the simulated transaction approval rate and the simulated fraud transaction rate.

16. Non-transitory computer-readable storage mediums comprising computer-executable instructions that, when executed by at least a processors of a server system, cause the server system to perform a method comprising:
accessing a set of payment transaction features corresponding to a plurality of historical payment transactions from a transaction database;
determining via a fraud model, a first set of rank-ordered payment transaction features based, at least in part, on a first set of shapley additive explanations (SHAP) values, each of the first set of rank-ordered payment transaction features indicating a contribution of a corresponding payment transaction feature in predicting whether a payment transaction from the plurality of historical payment transactions is fraudulent or non-fraudulent;

determining via an approval model, a second set of rank-ordered payment transaction features based, at least in part, on a second set of SHAP values, each of the second set of rank-ordered payment transaction features indicating the contribution of a corresponding payment transaction feature in predicting whether a payment transaction from the plurality of historical payment transactions is approved or declined;

computing a difference in ranks of payment transaction features based, at least in part, on the first set of rank-ordered payment transaction features and the second set of rank-ordered payment transaction features;

determining a set of utilized transaction features and a set of unutilized transaction features based, at least in part, on the difference in ranks of payment transaction features;

generating a simulated authorizing model, based at least in part on the set of utilized transaction features;

computing a simulated transaction approval rate and simulated fraud transaction rate for the simulated authorizing model based, at least in part, on the plurality of historical payment transactions;

generating a plurality of proxy authorization models based, at least in part, on the set of unutilized transaction features;

computing transaction approval rates and fraud transaction rates for each of the plurality of proxy authorization models based, at least in part, on the plurality of historical payment transactions;

computing an increase in transaction approval rate and a change in fraud transaction rate for each of a plurality of proxy transaction approval models based, at least in part, on comparing the transaction approval rates and the fraud transaction rates with the simulated transaction approval rate and the simulated fraud transaction rate;

determining one or more recommended transaction features from the set of unutilized transaction features upon determining that the increase in transaction approval rate for the one or more recommended transaction features and the change in fraud transaction rate for the one or more recommended transaction features are more than a predetermined threshold;

transmitting the one or more recommended transaction features to an authorizing entity;

utilizing, by the authorizing entity, the one or more recommended transaction features to determine whether a transaction is fraudulent and disapproved, or is approved;

receiving a payment authorization request for a real-time payment transaction between a cardholder and a merchant;

accessing payment transaction attributes based, at least in part, on the payment authorization request;

determining, via a machine learning model, a set of transaction approval rates for the real-time payment transaction based, at least in part, on the payment transaction attributes, each of the set of transaction approval rates indicating a transaction approval rate when one or more authorizing components are applied to the real-time payment transaction, wherein the machine learning model is a Deep Factorization Machine (FM) model including
- an FM layer that generates FM outputs by modelling low-order feature interactions based on the payment transaction attributes,
- a deep neural network (DNN) that generates DNN outputs by modelling high-order and low-order feature interactions based on the payment transaction attributes, and
- an output layer that combines the FM outputs and the DNN outputs to generate a final output;

generating an authorizing component recommendation based, at least in part, on a set of transaction approval rates; and transmitting the authorizing component recommendation to the authorizing entity.

* * * * *